(12) United States Patent  
Campos et al.

(10) Patent No.: US 9,238,894 B1  
(45) Date of Patent: Jan. 19, 2016

(54) SNOW PLOW/SCOOP CART

(71) Applicants: Roberto Pedro Campos, Rockville, MD (US); Lily Campos Nieberding, Kill Devil Hills, NC (US); Isabel Maria Campos, Rockville, MD (US)

(72) Inventors: Roberto Pedro Campos, Rockville, MD (US); Lily Campos Nieberding, Kill Devil Hills, NC (US); Isabel Maria Campos, Rockville, MD (US)

( * ) Notice: Subject to any disclaimer, the term of this patent is extended or adjusted under 35 U.S.C. 154(b) by 0 days.

(21) Appl. No.: 14/120,858

(22) Filed: Jul. 5, 2014

Related U.S. Application Data

(60) Provisional application No. 61/957,613, filed on Jul. 8, 2013.

(51) Int. Cl.
*E01H 5/06* (2006.01)
*B62B 1/04* (2006.01)

(52) U.S. Cl.
CPC . *E01H 5/061* (2013.01); *B62B 1/04* (2013.01)

(58) Field of Classification Search
CPC ............ A01B 1/00; A01B 1/02; B62B 1/147; B62B 1/04; E02F 3/02; E01H 1/00; E01H 1/12; E01H 5/00; E01H 5/02; E01H 5/061
USPC ................... 37/197, 241, 265, 270, 285, 434; 294/50.7, 50.9, 53.5, 54.5
See application file for complete search history.

(56) References Cited

U.S. PATENT DOCUMENTS

| | | | | |
|---|---|---|---|---|
| 2,930,152 A | * | 3/1960 | Pipkin | 37/434 |
| 3,594,932 A | * | 7/1971 | Eriksson | 37/241 |
| 4,179,828 A | * | 12/1979 | Brunty | 37/241 |
| 4,302,894 A | * | 12/1981 | Emma | 37/434 |
| 5,048,206 A | * | 9/1991 | Jones | 37/265 |
| 5,123,187 A | * | 6/1992 | Zamaria | 37/265 |
| D375,235 S | * | 11/1996 | Spear et al. | D8/10 |
| 5,918,921 A | * | 7/1999 | Samuelson | 294/54.5 |
| 6,219,944 B1 | * | 4/2001 | Byers | 37/265 |
| 6,922,920 B1 | * | 8/2005 | Stratz | 37/197 |
| D635,834 S | * | 4/2011 | Clink | D8/10 |
| 7,937,859 B2 | * | 5/2011 | Downes | 37/434 |
| 2005/0160632 A1 | * | 7/2005 | Williams | 37/265 |

* cited by examiner

*Primary Examiner* — Robert Pezzuto
(74) *Attorney, Agent, or Firm* — Law Offices of Steven W. Weinrieb

(57) ABSTRACT

A manually propelled cart for the removal of snow, with dual function as garden cart, comprising: a PVC framework with handles on its upper segment, and a scoop on its lower segment. The framework supported by a rectangular metallic plate adhered to its underside, disposed on top of two large wheels in the middle of its length, with an axle attached to the plate's underside providing the cart a seesaw motion. A pivoted scoop designed as a rectangular bin, with an open forward section and an axle attached to its bottom underside, rotates in a vertical plane. A latch mechanism disposed adjacent the scoop's rearwall, controls its automatic motions and is operated by pulling a cable connected to a handle. Two springs hooked to the scoop's sidewalls and to the supporting plate acting cooperatively with the latch. Two swivel casters underside the plate's forward end, makes the cart steerable.

12 Claims, 17 Drawing Sheets

FIG. 12
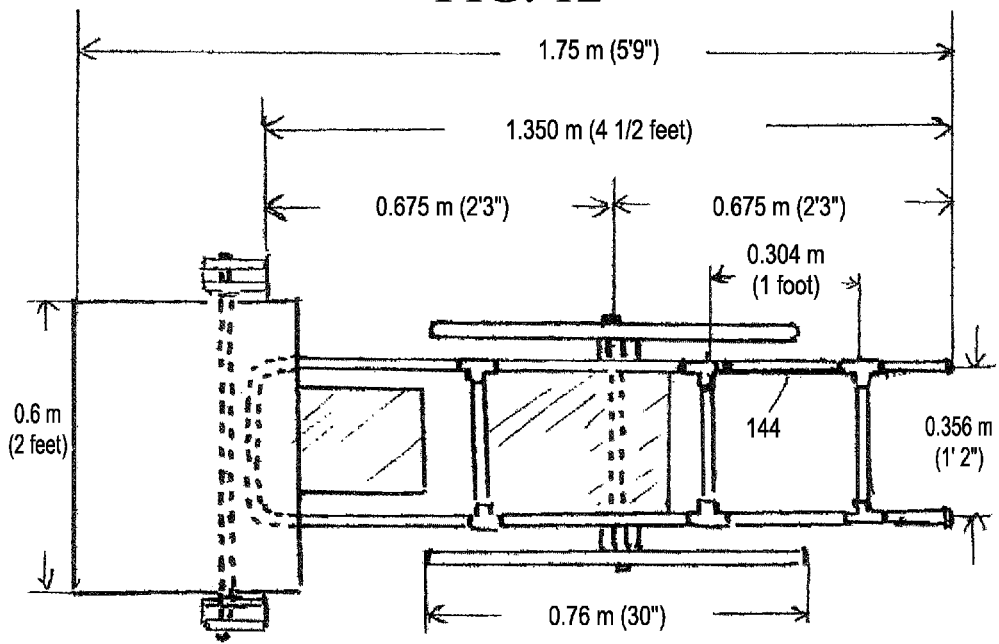
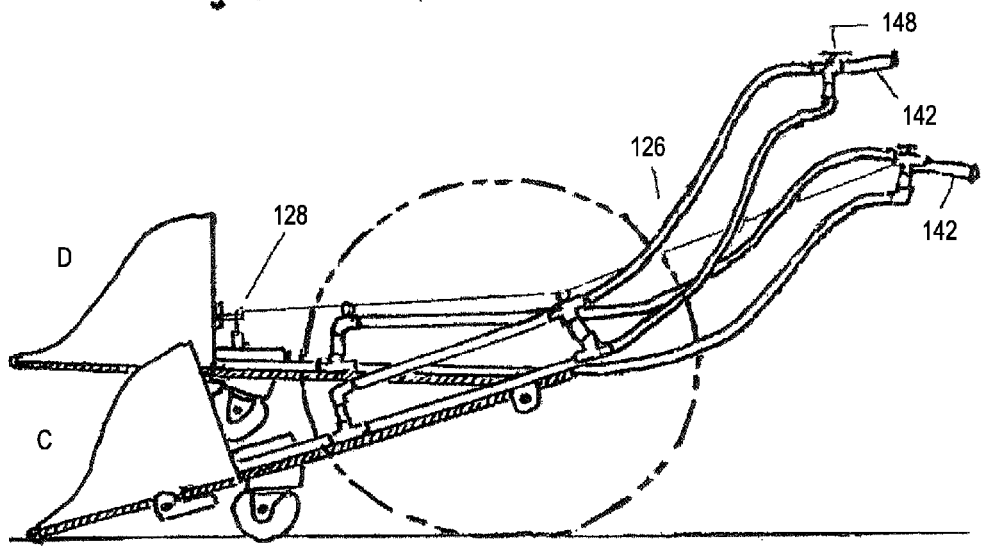
FIG. 13

FIG. 22
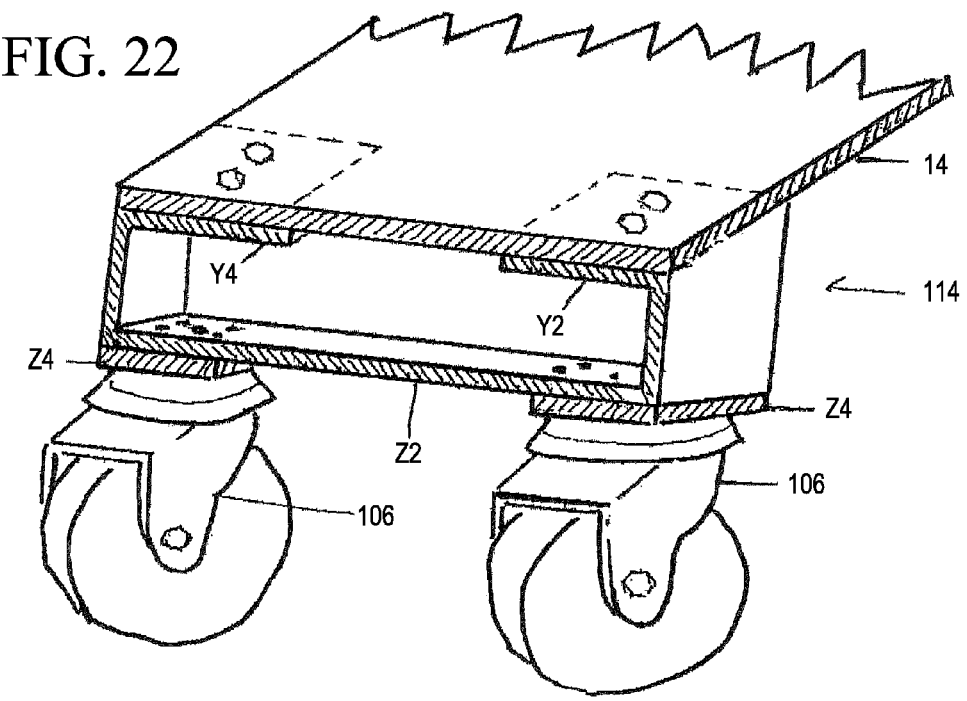
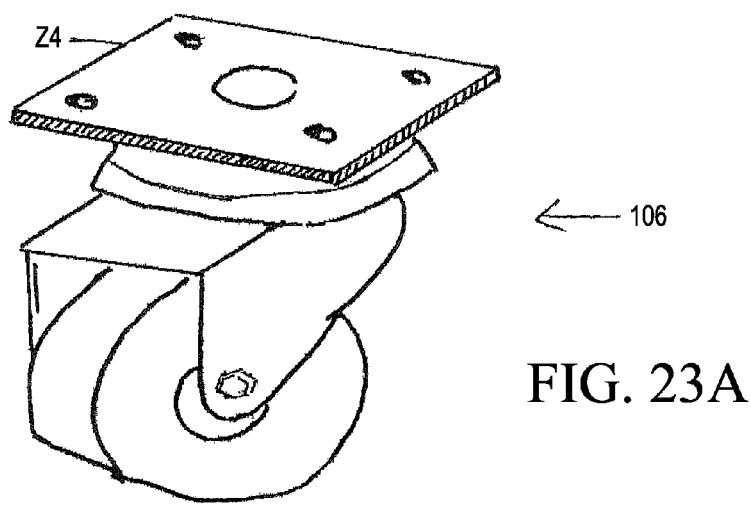
FIG. 23A

FIG. 29
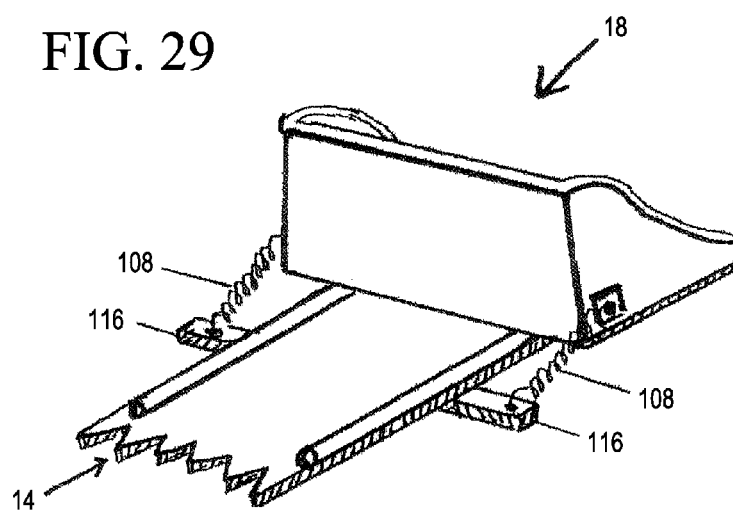
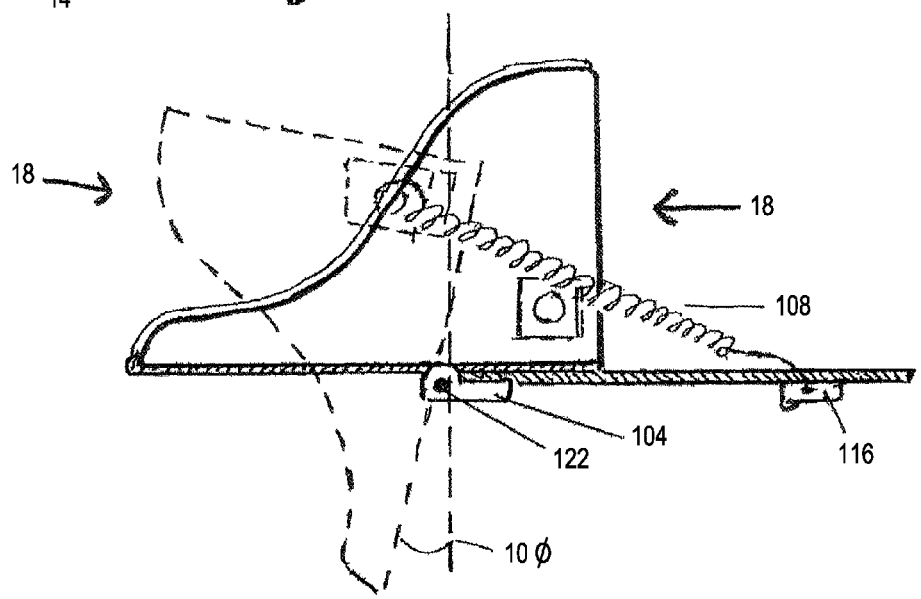
FIG. 30

FIG. 32
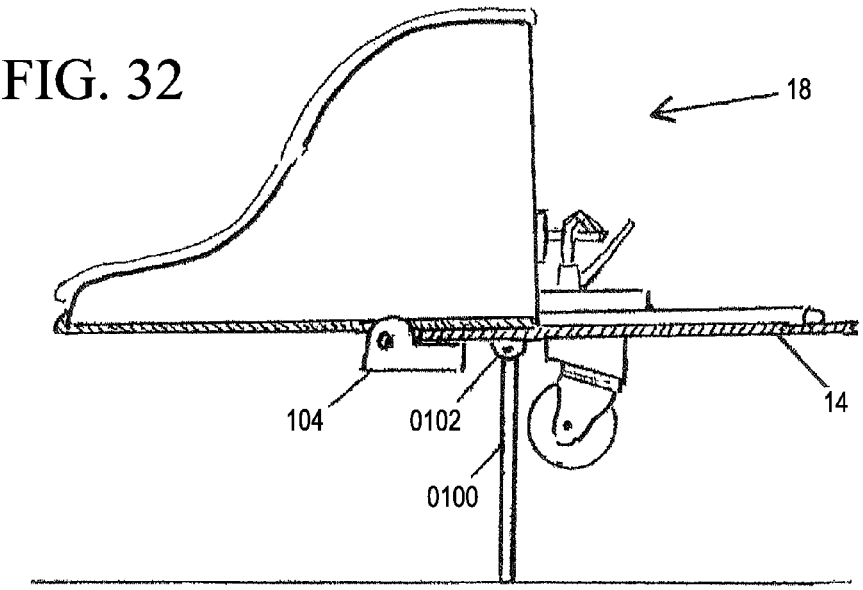
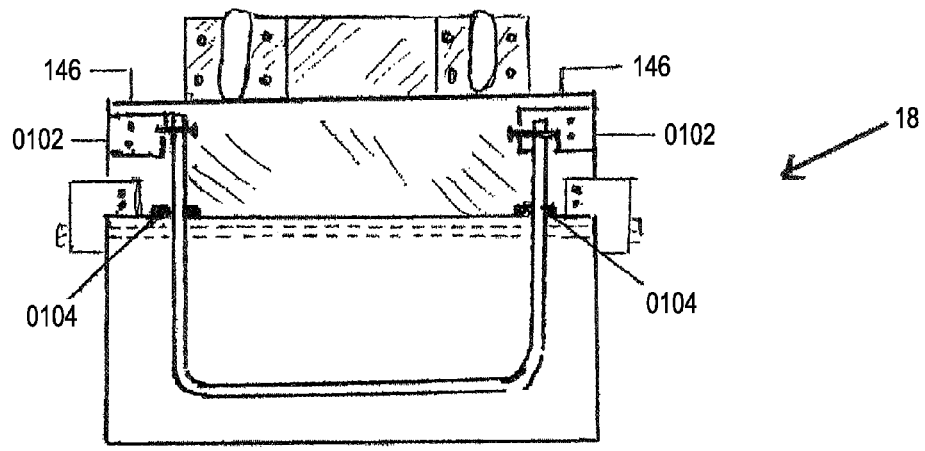
FIG. 33

SNOW PLOW/SCOOP CART

CROSS-REFERENCE TO RELATED APPLICATIONS

Provisional Patent filed Jul. 8, 2013—Application No. 61/957,613

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is in the technical field of new and improved manually propelled snow removal vehicles, with two large wheels and tilting scoops for scooping up to one feet accumulation in driveways, sidewalks and around homes and buildings. More particularly the field of the present invention relates to the incorporation of a cart with a special framework configuration with a new type of mechanical mounted tilting scoop unit.

According to its embodiment, the present invention has been expressly designed for the removal of snow, so it cannot be used for ice cracking or for picking up and transporting heavy materials. However, the embodiment of the invention permits one exception in its use which is that it can perform as a garden cart to transport bags of soil, fertilizers and other light weight garden items, as long as it does not surpass a comparable weight to a snow full scoop.

The need to remove snow has become an activity that does not discriminate a person's age, impelling most people to use a conventional shovel consisting of a blade and handle. That simple tool in many cases can cause severe damages to health, especially to seniors, due to continuous efforts of bending, lifting and throwing of heavy loads. The brisk last exertion, needed to discharge a load from a shovel results in back aches, muscular strains and even heart failure, all of which has been repeatedly expressed in prior arts and at this time should be interpreted as a wake up call.

Different efforts of improvements have been made by stages, aiming to simplify the use of conventional shovels, like the addition of small wheels to shovels blades which eliminates exertions when pushing and transporting snow.

In another stage, the addition of levered handles mounted on wheel axles it's been acknowledged. A significant step taken to help eliminate users efforts of lifting and transporting of snow, although leaving unsolved the elimination of the last physical exertion needed to discharge the load of snow, usually done by using arms and bodies.

In a later stage, a solution emerged in the heavy task of having to briskly throw loads of snow from blades or scoops to complete the whole operation of removing the snow. A tilting scoop mounted on the lower end of levered handles or frames, partially eliminated said last exertion for users. However, all these successful innovations still offer opportunities for improvements as it will be described further on in the present invention's description.

Examples of apparatuses equipped with tilting shovels or scoops pivotally mounted on handles or frames equipped with wheels are:

U.S. Pat. No. 4,302,894 to Sam F. Emma in Dec. 1, 1981, discloses a pivoted shovel on a roller of two small wheels; said wheels sizes limiting the elevation of the shovel.

U.S. Patent application No 2005/0160632 A1 of Jul. 28, 2005 to Cyril Williams, discloses a scoop pivotally mounted to the lower end of a frame, and upon activation of a release lever on the scoop head discharges its load. However the small sizes of its wheels allows a limited elevation of the scoop to release its load when the user exerts downward pressure on the handle bar.

U.S. Patent application No 2009/0320331 A1 of Dec. 31, 2009 to Johans S. Adinata, discloses a snow shovel with a spring-loaded shovelhead. A small wheel assembly acting as a fulcrum is attached to the device for easy handling of a snow load; the shovel head being able to tilt downward against a spring loaded mechanism. Like in the previous example the shovel elevation is limited by the small size of the wheel.

A common limitation in the aforementioned example (consisting in fulcrums too close to the ground surface, mainly due to the small sizes of the wheels which translates into a considerable effort for users when bearing down on handlebars) was improved with the use of large sized wheels in apparatuses like the ones indicated below:

U.S. Pat. No. 6,735,887 Manual snowplough, issued to Mohiuddin Muzzamel on May 18, 2004, discloses a snowplough that has a handle on one end and a large snow scoop on the other. The plough is supported on a frame that is mounted on a pair of large wheels placed well behind the snow scoop. Said wheeled plow limitation derives from the fact that the scoop is fixedly attached to the frame and therefore has no tilting movement.

U.S. Pat. No. 7,111,418 issued on Sep. 26, 2006 to Mark Noonan et. al, discloses an apparatus comprising a shovel disposed on a single relatively large wheel. The apparatus involves a shovel having a handle formed at the end of an elongated yoke, the yoke being mounted at its middle portion onto the axle of a relatively large wheel for the purpose of picking up of a load, transporting it to a location, and propelling the load overboard with a quick arm/body motion on the part of a person operating the handle. The substantially waist-high wheel is adapted to receive the body force of an operator as an effective leverage through the handle and cause a recoil action from the wheel to enhance the throwing power of the apparatus of the invention comprising the shovel, the wheel and the yoke as a driving member.

Now, said Mark Noonan invention being disclosed, with a sophisticated mechanical device that enhances the throwing power, is an innovation. However, because the Noonan apparatus has a shovel mounted in one single wheel, its operators have to make additional physical efforts, first to maintain the lateral balance of the apparatus while pushing it to transport its load toward a selected dumping place, and second, as it is claimed on its own patent application, a final physical exertion must be made by an operator "applying a quick arm/body motion", walking in haste to throw its load overboard, an operation that may find a complication mainly when an accumulation of snow surpasses one foot in areas adjacent to driveways and sidewalks. Said disadvantages of the referred invention need to be solved, focusing on improving load discharge with a different mechanical approach related to the shovel. Its current system does not thoroughly ensure eliminating users exertions.

To summarize, although it is apparent that current state of the art of apparatuses equipped with large wheels and tilting scoops involved in the removal of snow in driveways and sidewalks, intend to cover all the functions needed to safely complete a whole operation of removal, they still seem to offer opportunities for further innovations and improvements.

BRIEF SUMMARY OF THE INVENTION

The main object of the present invention is to provide a new and improved snow plow/scoop cart with big wheels, which differs physically and operationally from prior arts disclosed in the Background involved in the removal of snow in driveways and sidewalks, around homes and buildings. The novel aspects offered by the present invention, almost totally eliminate the disadvantages of prior arts which can cause stresses and brusque exertions for older users specially seniors, mainly during the last physical effort in the discharge of heavy loads of snow, wherein the present invention finally brings along a definitive solution that has been much needed for a long time.

Structurally, the present invention of cart 10's embodiment also provides the capability that allows said cart 10 to perform a dual function, being the main one as a snow plow/scoop cart, and the additional one as a garden cart, as specified in the last paragraphs of the Detailed Description of the present invention.

In order to achieve all the improvements needed, mentioned in the previous paragraphs, the embodiment of the present invention generally involves a new snow plow/scoop cart configuration, capable of scooping about 11.3 Kg (50 Lbs) of snow, with a new and structurally different type of framework, built distinct to prior arts, a snow cart that comprises two large sized wheels and a large tilting scoop.

The new snow plow/scoop cart's framework particularly built with PVC tubes, reinforced with a supporting plate of aluminum, is a combination not seen in previous arts; said lightweight materials are resistant to impact and stresses. It is therefore an object of the present invention, to provide a new and unique design of said framework, with an upper portion and a lower portion, having a tilting scoop in the lower portion with a latch system next to it and a lever supported by a crossbar in the upper portion, that are needed to control the tilting motions of the scoop.

Another object of the present invention is to provide a metallic component of the framework consisting of a rectangular aluminum plate adhered to the underside of the framework tubing and responsible for the reinforcement of the whole PVC structure of the snow plow/scoop cart. Said metallic plate also provides locations for subcomponents like brackets for the wheels, axle and tilting scoop and others that will be described further on.

Still another object of the present invention involves an improvement brought along by a distinct assembly of the two large wheels which are connected to each other by a steel axle upon which the cart's framework is pivotally mounted in the middle of its length. Wheel bearings play an important role in securing smooth seesaw motions of the invention's cart. In addition, a couple of swivel/spring loaded casters located in the lower portion of the framework, contribute in general to the smoothness of the invention's cart.

All previously referred components of the present invention, cooperatively related, ensure a smooth and complete cycle of operations for the removal of snow, consisting of plowing, scooping up, transporting and discharging loads of snow, with the operator standing in erect position, without having to run, hastily walk or use arm/body in order to discharge the load, which is done automatically by the scoop by means of a latching device controlling its motions, a main feature in its embodiment described further on in greater detail.

By virtue of its large wheels and seesaw motions, the present invention is capable of performing all said operations of snow removal, and of scooping up and discharging up to one foot of snow in a fraction of time, compared to snow blowers, and substantially eliminating users' exertions while carrying the cart significant distances.

Also, the large wheels enable the present invention's cart to roll at optional speeds an operator can use to help reduce considerable periods of time for staying outdoors, which is needed to remove large amounts of snow before it starts getting into the freezing point, transforming itself into ice during harsh winters. At said critical situation, the reduced staying out time will protect the health of most users especially seniors.

In addition to other favorable aspects offered by the new snow plow/scoop cart, it is necessary to point out that its operations cause no emissions of fumes, making it a safe and healthy apparatus for both the operator and the environment, compared to snow blowers.

A particular object of the present invention is to provide a significant improvement to large wheeled apparatuses with tilting scoops, consisting of a new large size, manually operated, self dumping tilting scoop, ergonomically configured as a rectangular container made of PVC, with a metallic reinforcement in its underside.

A new distinct mechanical arrangement that makes the scoop tilt down in a forward direction to discharge its loads of snow, and automatically return to its original position, consists of a latching device and springs cooperatively related which control said tilting motions.

Finally, another object of the present invention involving an improvement for apparatuses equipped with large wheels, is to provide a couple of swivel/spring loaded casters assembly adhered to the underside of the snow plow/scoop cart, mounted in the forward portion of said cart, and being responsible for its turning motions.

BRIEF DESCRIPTION OF THE SEVERAL VIEWS OF THE DRAWINGS

In drawings where the two large wheels are depicted, one wheel is drawn in phantom to reveal details behind it.

Most views are freehand drawings. FIGS. 11 and 12 with dimensional relationships are of an approximate scale of 1 inch: 1 foot.

FIG. 11 Side elevation view of present invention with dimensional relationship.

FIG. 12 Top plan view of present invention's cart and dimensional relationship.

FIG. 13 Side elevation view of the present invention, showing scoop positions of scooping and transporting snow.

FIG. 22 A partial perspective broken away view of a freehand, non scaled drawing, showing assembled casters that shows the slanted shape of its top side y2-y4.

FIG. 23A Freehand perspective view of an exemplary caster 106 showing its own mounting plate z4 with 4 boreholes and a center hole for its swivel motions kingpin.

FIG. 29 Broken away perspective view of forward end of cart 10 of the present invention, showing rear of scoop 18 and assembly of springs 108 connections for scoop 18's tilting motions.

FIG. 30 Non-scaled, freehand drawing of a side elevation view of scoop 18 moved from a horizontal plane position, in a tilting forward motion, and a stop position at 10 degrees from a vertical axle.

FIG. 32 Non-scaled drawing showing side elevation view of scoop 18, with collapsible post 0100's location, standing in vertical position and pivoted in bracket 0102 behind scoop 18's supporting bracket 104 situated underside plate 146

FIG. 33 Plan view of scoop 18's underside, showing brackets 0104 adhered to plate 146, and clutches 0106 that retain post 0100 after it is brought to rest position under scoop 18. Also shown are clutches 0106 adhered to plate 146 front edge.

DETAILED DESCRIPTION OF THE INVENTION

Figure 1:
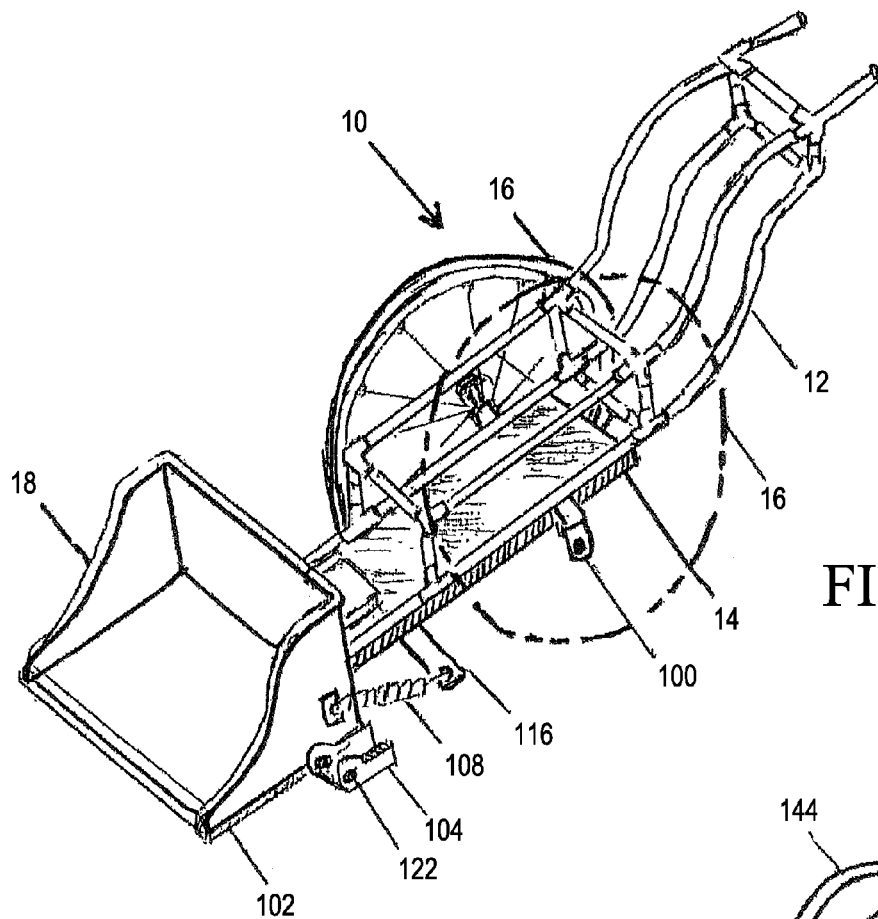
FIG. 1 Perspective general view of the embodiment of the snow plow/scoop cart of the present invention.

Referring now in more detail to the invention, FIG. 1 illustrates its embodiment consisting of a structure configured as a manually operated cart 10, with a total length of 1.75 m (5 feet 9 inches) and an average width of 0.5 m (19¾ inches), with a framework 12 built with PVC tubes and a supporting metallic plate 14 attached underneath said framework 12. Said metallic-supporting plate 14 made of aluminum jointly with framework 12 is an integral component of cart 10 and acts as a driving member. Cart 10 has an assembly of two large wheels 16. FIG. 1 shows the left wheel in phantom to reveal details of the right side of cart 10. A pivoted tilting scoop 18 made of PVC situated in the lower end of framework 12 designed to perform all the functions of picking up snow.

Figure 2:
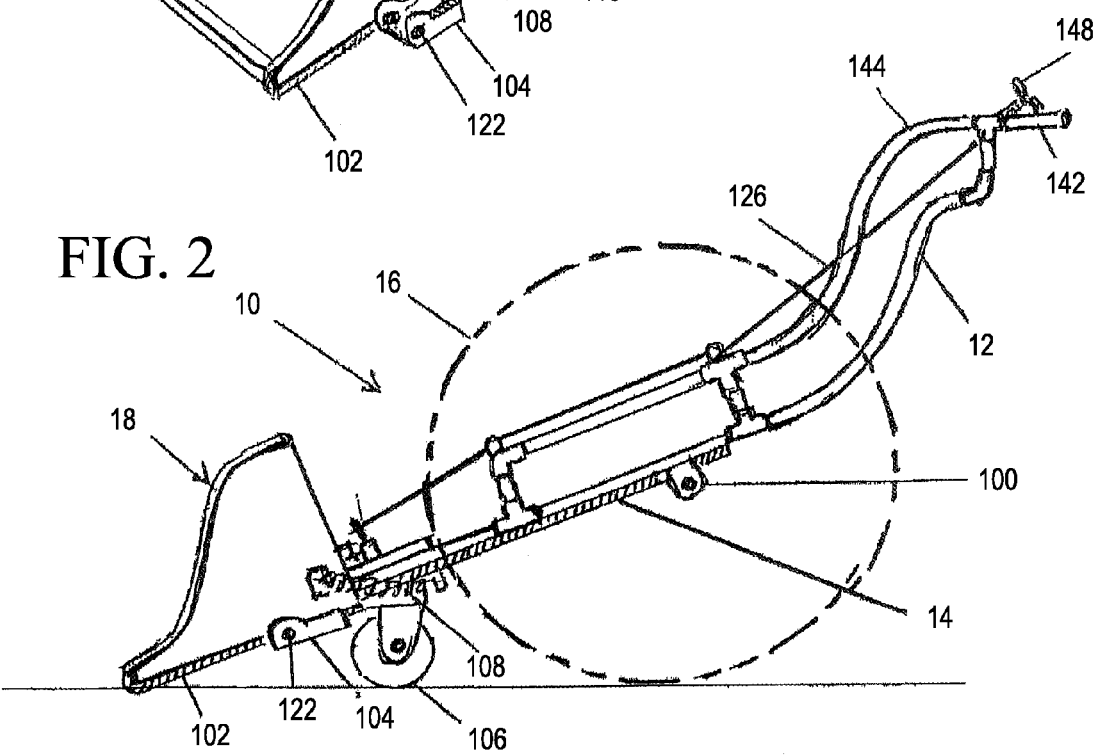
FIG. 2 Elevation view of the apparatus shown in FIG. 1 of the present invention.
Figure 3:
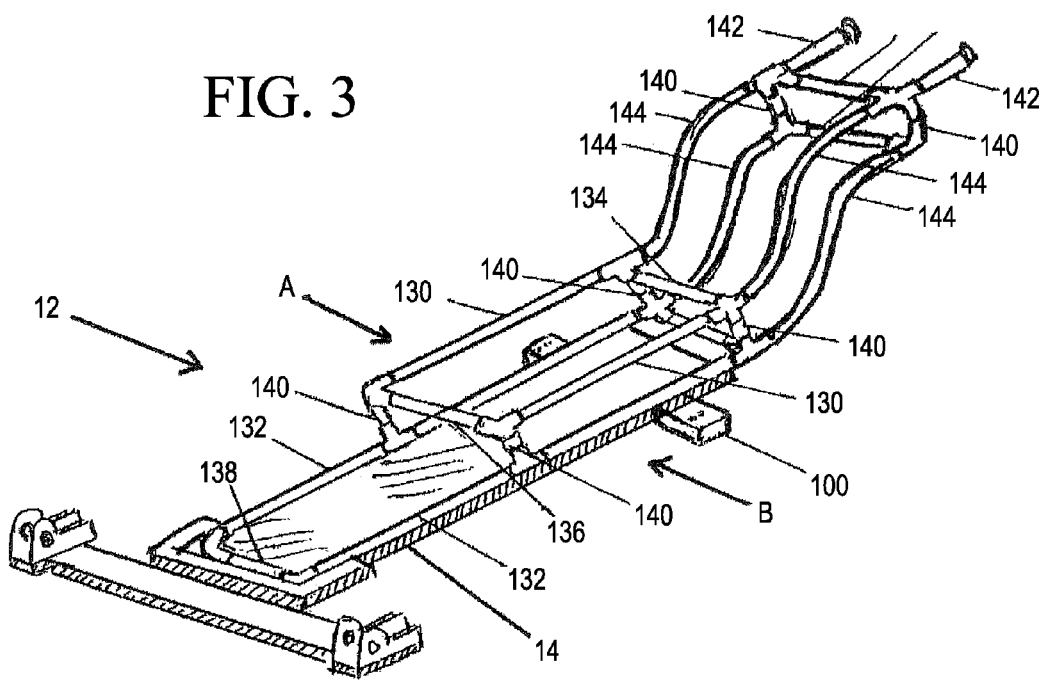
FIG. 3 Perspective view of the PVC framework 12 of the present invention shown in FIG. 1.
Figure 4:
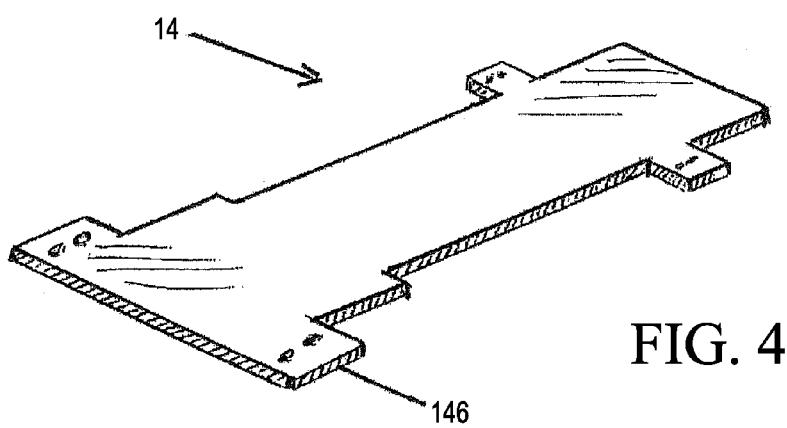
FIG. 4 Perspective view of aluminum plate 14 that support framework 12 shown in FIG. 3
Figure 5:
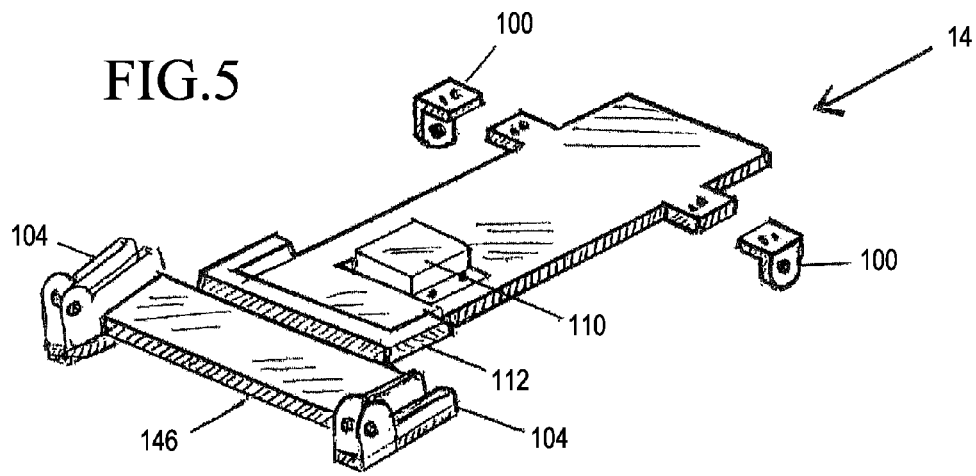
FIG. 5 Topside perspective view of supporting plate 14 showing brackets 100 for wheels assembly and rectangular base 110 for latching device of scoop 18.
Figure 6:
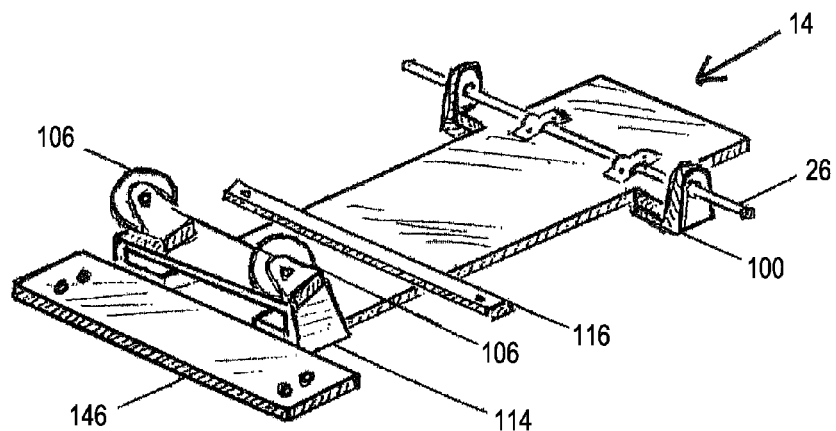
FIG. 6 Perspective view of underside of plate 14, showing casters 106, bracket 116 for scoop's springs and brackets 100 for wheels axle 26

FIGS. 2-3 depict details of the framework assembly 12 an array of tubes situated on top of plate 14 of cart 10. Said framework 12 replaces the conventional frames of wheeled prior arts. FIG. 4 shows the aluminum plate 14 which is an integral part of framework 12, said plate 14 is the most strong and durable structural part of cart 10 consisting of a rectangular piece adhered to the tubing in the underside of framework 12. As shown in FIGS. 4-5-6 said plate is significantly important, as it is responsible for providing support and reinforcement to the whole PVC structure of framework 12 and particularly for the exact locations of the wheels 16's mounting brackets 100 and other subcomponents described further on.

Figure 7:
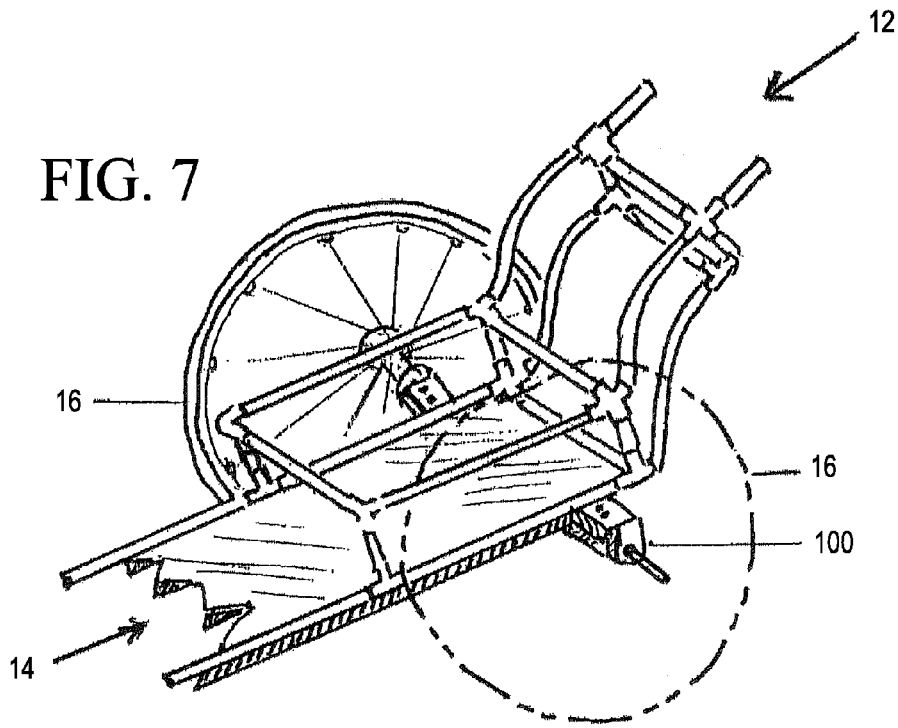
FIG. 7 Broken away top perspective view of large wheels 16 assembly of the present invention showing part of framework 12.

FIG. 7 depicts topside of plate 14, which supports wheels 16 of the present invention according to its embodiment, consisting of an assembly of two large wheels 16 with rims 22 and spokes 24. Although there may be different other options of wheels applicable to the invention, like for example, wheels with tires with inflatable tubes, or with tubeless air inflated tires etc; according to its embodiment the present invention uses tubeless rubber tires as well as semineumatic narrow solid tires, which helps to avoid compressing the snow path. Said type of semineumatic tires are light weight, puncture free, and provide cushioning as they are not pressurized, and some even come with integral ball bearings.

Figure 8:
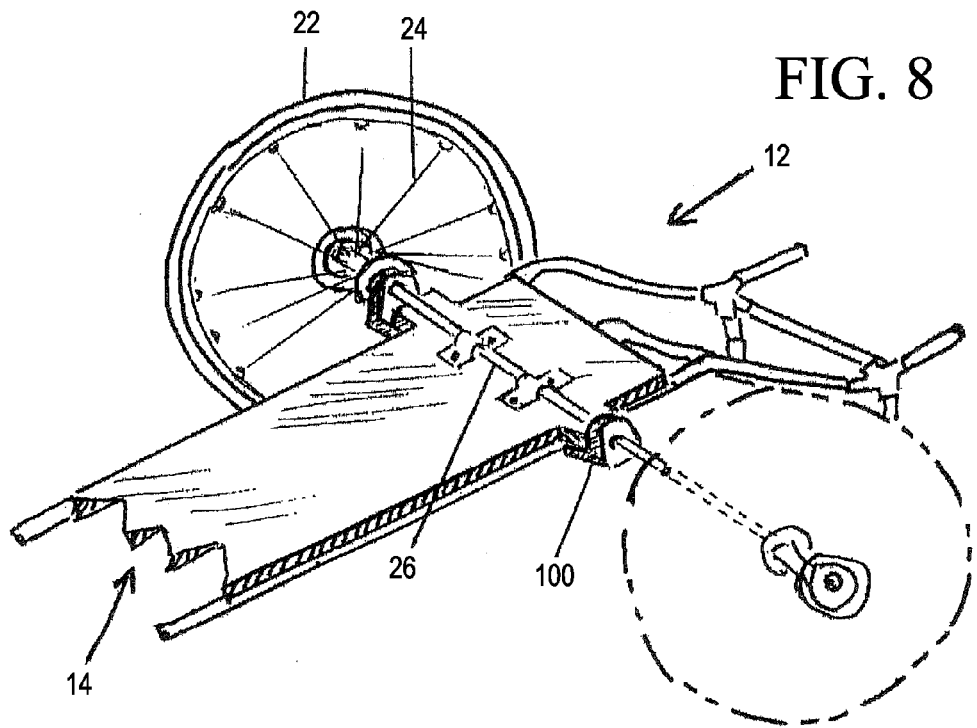
FIG. 8 Broken away perspective view of underside of framework 12, showing same wheels assembly shown in FIG. 7, depicting axle 26 and supporting brackets 100 under plate 14.

FIG. 8 depicts wheels axle 26 adhered to the underside of said plate 14, which coincide with the middle of framework 12 length shown in FIGS. 1-2. Two L-shaped brackets 100 symmetrically lodged and adhered on top of 4" extensions right and left edges of plate 14, wherein said axle 26 is put across to penetrate in the wheels 16 that way defining the fulcrums of cart 10 in both right and left sides. FIG. 2 shows the wheels 16 and framework 12 on top of plate 14, with cart 10 on its upright position.

FIGS. 1-2 illustrates the tilting scoop 18 ergonomically configured as a rectangular PVC container with a metallic reinforcement 102 on its underside. An axle 122 is fixedly adhered to said scoop 18's underside. Said scoop 18 is pivotally mounted on brackets 104, and situated at the forward end of cart 10. Scoop 18's tilting motions are controlled by a latching mechanism 118 (FIG. 2 indicates location) and by two springs 108 needed for the scoop 18 return motion which is described further on.

As shown in FIG. 6, two swivel spring loaded casters 106 pivotally mounted on plate 14 underside, provides cart 10 the capability of performing directional changes as cart 10 is moved around plowing, picking up or transporting snow.

FIGS. 2-3 of the present invention illustrates framework 12, built with a combination of light weight materials, mainly PVC tubes adhered to the aluminum reinforcement plate 14, said framework 12 with said plate 14 jointly forms a driving member to push and maneuver cart 10. Its assembly added to other lightweight components, like wheels 16 and scoop 18, ensures any user a safe, smooth and effortless operation of cart 10.

As depicted in FIGS. 1-2-3, the aluminum plate 14 is adhered to the tubing in the underside of framework 12 by means of mechanic fasteners as explained in detail further on in paragraphs referring to construction details. A strong assembly is necessary to enable plate 14 to perform its role of providing the needed support to cart 10 and at the same time as part of the driving member jointly with framework 12. By reinforcing the array of tubes of framework 12, generally the whole cart 10 of the present invention gets supported.

FIGS. 4-5-6 depict the aluminum plate 14 that in addition to its reinforcement role to framework 12 also provides a base for various metallic subcomponents related to the operations of cart 10 as follows:

Mounting brackets 100 for the wheels 16
Mounting brackets 104 for the scoop 18
Mounting bracket 114 for swivel casters 106
Angular bracket 112 designed as a stop piece
Mounting base 110 for scoop 18's latching device 118
Mounting bracket 116 for scoop 18's springs 108

The large wheels 16 illustrated in FIGS. 7-8, pivotally assembled in the middle of framework 12's length are mounted on brackets 100 wherein rotates freely around its axle 26. The considerable height of said large wheels 16 with a diameter of 30 inches, enables an operator to lift scoop 18 of FIGS. 1-2, loaded or unloaded, and roll over the unscooped snow blankets without compressing the snow.

Also, the heights of wheels 16 enables an operator to use the advantage of the seesaw movements of cart 10, to scoop up to one foot of snow without having to scoop the whole blanket all at one time, if it is so wished, plowing instead by layers, which is more comfortable, especially for seniors. All the operations of plowing, scooping up and lifting lighter loads of snow can be easily performed that way.

Still referring to wheels 16 large size, the removed snow can be easily carried by cart 10 of the present invention, for extended distances without exertions from users, which is an asset in regions with significant snowfall.

A significant further object of the present invention is to eliminate users physical exertions when discharging loads of snow, wherein the size of said wheels 16 enables the tilting scoop 18 to reach a desire height needed to discharge a load of snow acting both such components cooperatively together. Then, said described novel combination in the cart 10 of the present invention definitely departs from prior arts equipped with large wheels, as it solves most carts deficiencies in their snow discharge systems.

One example, is the apparatus disclosed by Mark Noonan, described in the Background section of the present application, that consists of a shovel with a large single wheel, wherein first because of its big size the user needs to make extra efforts like having to avoid the tipover of the apparatus when speeding up to reach the place needed to expel the snow from its shovel blade. Second, a final physical exertion is needed to throw the load wherein the operator has to bear down on the handle with a quick arm/body motion while walking in haste to throw its load. The present invention cart 10 due to its pair of large wheels 16 and the self dumping tilting scoop 18 definitely eliminate said limitations.

Now, the main object of the present invention substantially focuses on the pivoted tilting scoop 18 of FIGS. 1-2, a leveraged arrangement provided as another innovation to wheeled snow scoops apparatuses. Said scoop 18 addresses prior arts deficiencies like scoops or shovels that require physical efforts from the operators in order to dump loads of snow, where mostly brusque exertions have been needed to discharge snow resulting in back aches, strains and even heart failure.

The present invention discloses a new mechanism manually operated that causes the scoop 18 to freely rotate with a tilting capability, self-dumping its load in a forward direction causing the snow to fall to the ground surface by the force of gravity. No effort from the operator is needed at all, since the tilting motions are controlled by a release assembly actuated by only one hand by pulling a handle connected to a flexible cable which releases a latch 118, adjacent to the rear wall of the scoop 18, having said latch 118 a lock and unlock position as described in FIG. 27, detail of construction, further on.

Figure 9:
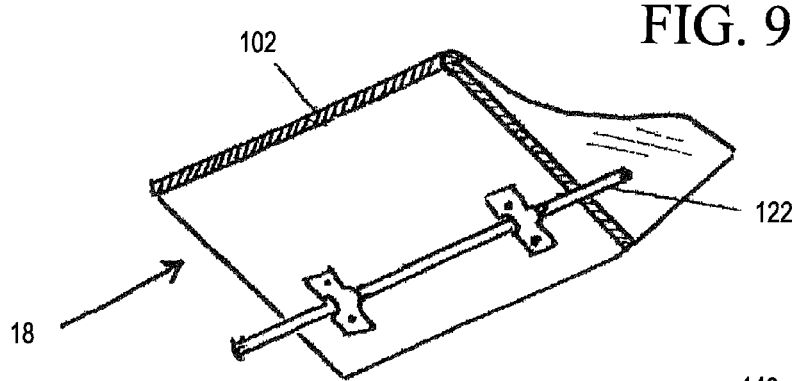
FIG. 9 Perspective view of underside of the invention's scoop 18 showing metallic reinforcement 102 of the scoop's bottom and fixed axle 122.

Also, as shown in FIG. 9 there is an axle 122, fixedly attached by means of metallic clamps to a metallic reinforcement plate 102 in the underside of scoop 18. Said fix attachment ensures that axle 122 and scoop 18 will rotate together whenever scoop 18 gets unlatched.

Another essential object of the present invention that provides an improvement to apparatuses which have large wheels and are manually operated is the addition of two swivel/spring-loaded casters 106 as shown in FIGS. 2-6. Said type of casters, are an innovation not seen in prior arts, as they provide cart 10 the capability to maneuver changing directions by the action of their swivel mechanism.

FIG. 6 illustrate casters 106 pivotally mounted on lower end of plate 14, in such way that when cart 10 is on its normal standing position (FIGS. 1-2) with scoop 18's edge resting on the ground surface on its 20 degrees angle ready to engage snow, an operator uses handles 142 to push cart 10 to any desired direction wherein casters 106 with their capability to perform directional changes, will enable an operator to drive cart 10 and start plowing to embark snow into scoop 18.

Casters 106 make smoother all the snow removal operations eliminating most physical exertions to users. The directional effect added to cart 10 when the operator pushes and steers at the same time, produces a similar effect to the one seen in utility carts like for example wheel chairs.

In addition to the swivel effect provided by the casters 106, the spring loaded on them brings along other improvements as they ensure quieter rides in the snow path wherein springs make casters act as bump stop and shock absorbers, thereby eliminating the exertions made by users, especially seniors, when pushing to plow the snow.

Depicted in FIGS. 3-5 is an angular bracket 112 located widthwise on top of plate 14's forward end. Said bracket 112 designed to act as a stop piece for driving member 12 pushing by means of crossbar 138 which is the push piece.

Figure 27:
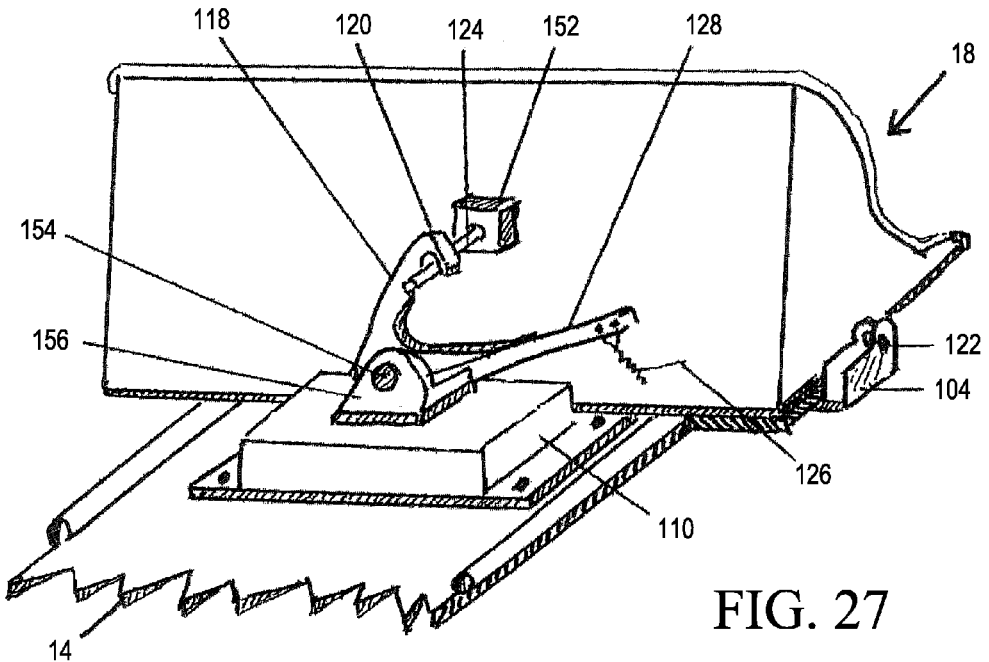
FIG. 27 Perspective view showing rear of scoop 18 of the present invention, with latch mechanism in a latched position.

As shown in FIG. 2, by virtue of the large size of the wheels 16 and seesaw motion of the framework 12, the weights of scoop 18, casters 106 and others located in the most lower extent of cart 10, will per se carry down said scoop 18, leaving its scooping edge resting on the ground surface, in such position cart 10 is ready to start plowing with scoop 18's latch 118 of FIG. 27, in latched position.

The scoop 18's PVC and the casters made of aluminum, both of light material, will not reduce significantly the capacity of scoop 18, to embark and lift up to 50 lbs. of snow.

FIG. 13 illustrates two positions in the operation of cart 10's snow removal, in accordance to the present invention's working embodiment. The first position indicated by letter C in the drawing, show cart 10 in its normal standing position, with the scooping edge of scoop 18 resting on the ground surface, ready to start plowing, which is done by the operator holding into the handles 142 and pushing forward. Then after the scoop 18 has picked up any amount of snow desired, and in order to start transporting the load of snow to a selected dumping area, the operator bears down just 20 degrees on handles bringing cart 10 to position D as shown in said drawing, parallel to ground level.

Figure 14:
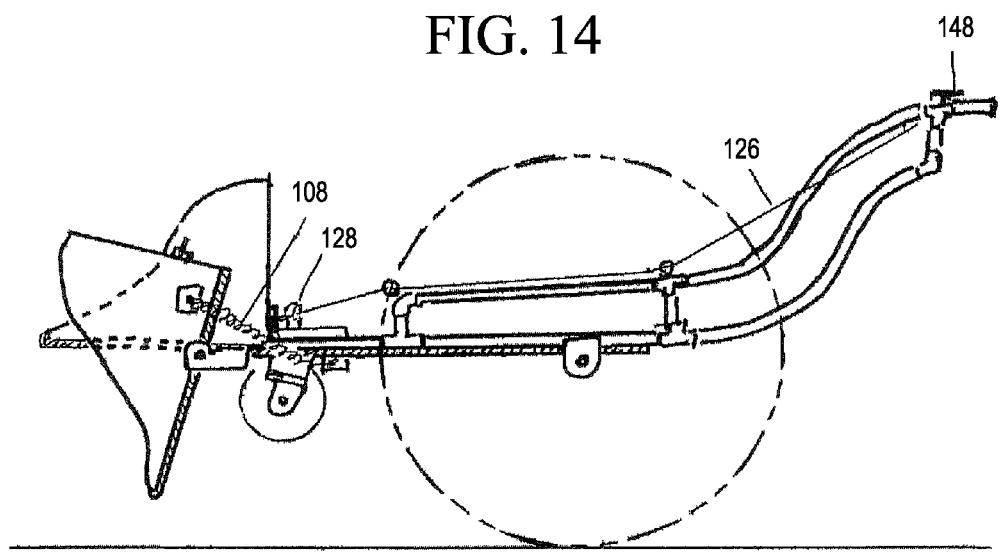
FIG. 14 Side elevation view of present invention's scoop demonstrating dumping capability.

FIGS. 13-14 depict a lever 148 mounted on top of the first crossbar 134 of framework 12's top portion, connected to the upper end of flexible cable 126, and its lower end to the release handle 128 of scoop 18's latching devise 118 (FIG. 27)

FIG. 14, demonstrates scoop 18's dumping capability after arriving to a selected dumping place, wherein the operator stops cart 10 to operate the scoop 18's tilting device while still parallel to ground level, and scoop 18's latch in latched position. The operator, with one hand pulls lever 148 to actuate the release system located adjacent to the rear wall of scoop 18 prompting latch 118, still in latched position, to unlatch. At that point, the scoop 18 will tilt down on its ballbearings discharging its load that falls to the ground by gravity.

The tilting of the scoop 18 can be made to stop at a certain angle, which relies on the calculation of the length of travel of the springs 108 that provides a point of stop. Said point of stop is directly relative to the scoop's angle of stop which is desired to be of 10 degrees relative to a vertical axis. More construction and operational details are specified further on, and depicted in FIGS. 28-29-30

After the scoop 18 stops tilting over and gets emptied, it will automatically tilt back returning to its starting point by the force of springs 108 (FIG. 14) When the scoop 18 finally rests on its original starting place, the latching device, which has two positions: latched and unlatched, returns to its latched position meaning the scoop 18 again gets locked. Said release system is detailed further on in the construction details that follow.

Now, referring to the construction details of the snow plow/scoop cart 10 as illustrated in FIGS. 1-2, one significant feature embodied in the present invention, is that it brings along the use of PVC materials not seen in prior arts. Among said PVC properties are its light weight. Comparatively PVC tubes weigh approximately half of the aluminum ones of the same measure, which facilitate the manufacture of cart 10. In addition, PVC tubes have been recognized as a less expensive alternative to metal tubes, which may contribute to reduced manufacturing costs.

The novel framework 12 assembly is built with an array of SCH 40 PVC tubes of 25.4 mm (1 inch) diameter, an integral part of cart 10 of the present invention, being said tubes specifically selected for their outstanding corrosion and weather impedance, high strength to weight ratio, and quality of self extinguishing in flammability tests, which means no emissions of flames. Also PVC tubes withstand shocks and are resistant to impacts.

The PVC tubes of cart 10 of the present invention and their dimensions measured between Connectors are as follows:

Two tubes 130—0.450 m (1½ feet)
Two tubes 132—0.900 m (3 feet)
Four tubes 134—0.356 m (1 foot 2 inches)
One tube 136—0.356 m (1 foot 2 inches)
One tube 138—0.356 m (1 foot 2 inches)
Six tubes 140—0.150 m (6 inches)
Two tubes 142—0.150 m (6 inches)
Four S tubes 144—(linear dimension calculated by manufacturer)

FIG. 3 illustrates two parallel lateral panels A and B to form the right and left sides of cart 10. Said sides are constructed by putting together eight tubes of equal diameters of 25.4 mm (1 inch) wherein four tubes are elongated and four with an S shape.

FIG. 3 depicts said lateral structures A and B, panel A in the right side and B in the left, identifying the tubes as follows: two S shaped tubes 144 in panel A and two in panel B the four of them forming the upper portion of framework 12. Then, two elongated tubes in panel A and two in panel B. The four of them parallel to a generally horizontal plane identified as follows: two tubes 130 and two tubes 132. Also, two short tubes 142, configured as handles and located in the most upper portion of framework 12, are connected to two S tubes 144

Figure 11:
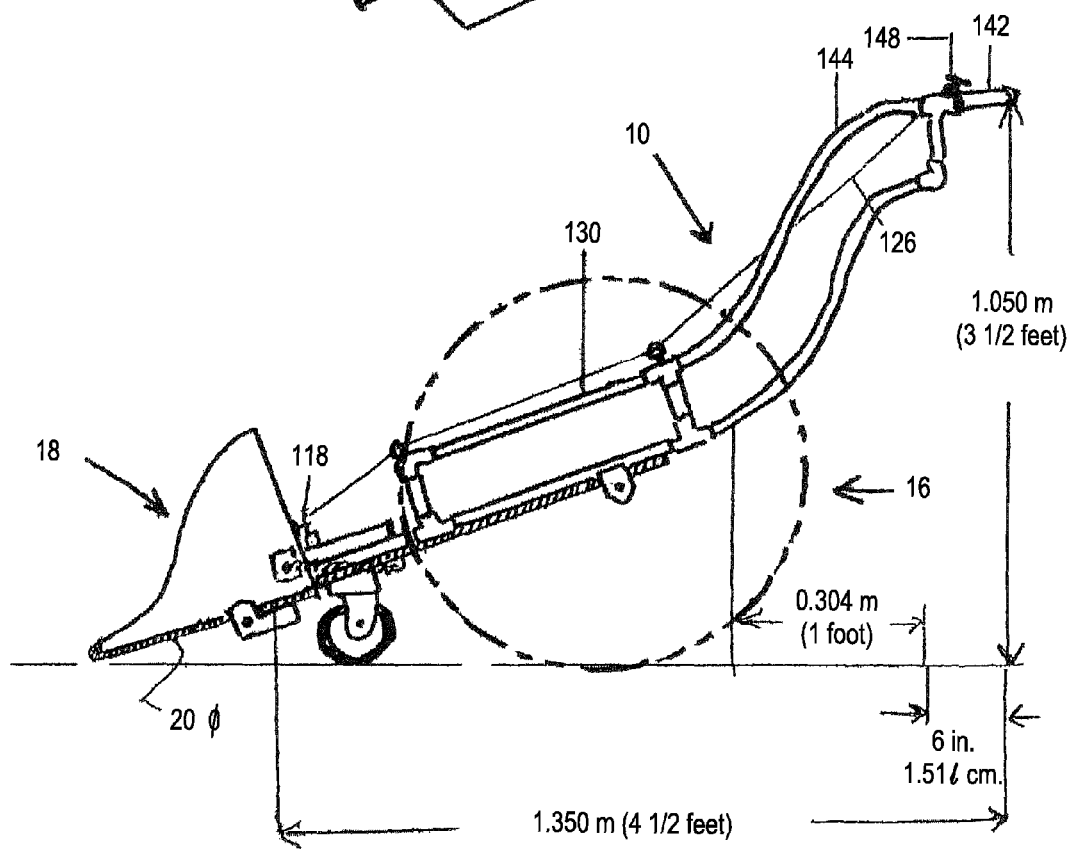

As shown in FIG. 11, tubes 144 are ergonomically configured with an S shape, outlined that way to provide comfortable use of handles 142 which are also made ergonomic with a cover of neoprene for comfortable grip. The height of handles 142 relative to the ground surface can be approximately 1.050 m (3½ feet) or about a user's waist.

As illustrated in FIG. 3, lateral panels A and B are connected together by means of six horizontal crossbars of the same dimensions, four 134, one 136 and one 138. Said crossbars provide strength to tubes of framework 12 by transversely connecting both lateral panels A and B, and maintaining parallelism and accurate spacing between them. Said crossbars sizes can be: 0.356 m (14 inches) long, each measured from the center of the indicated connectors as illustrated in FIGS. 3-10 and also in FIG. 12 a top view drawing showing dimensional relationship of cart 10.

As shown in FIGS. 1-2, crossbar 134 is a support for a lever mechanism assembly 148 which is manually used to pull a cable to actuate a latching system mounted in the back of scoop 18 and adjacent to it.

As depicted in FIG. 3, crossbar 138 located in the forward end of framework 12 is the push piece of the driving member, (which is framework 12 and plate 14 acting jointly together). Said crossbar 138 is connected to elongated tubes 132 by 90 degree Elbow Connectors.

Figure 10:
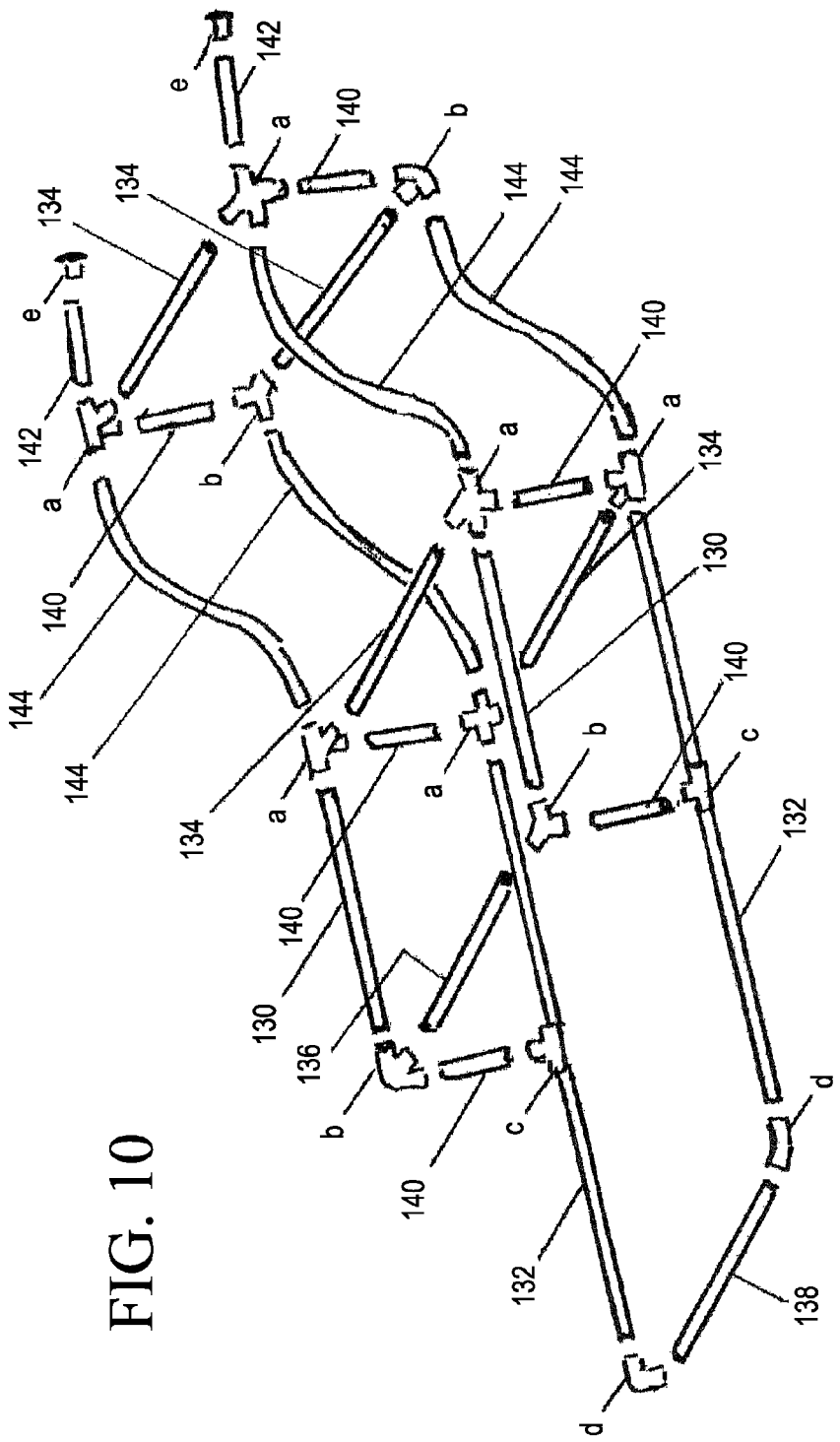
FIG. 10 Exploded view of the present invention framework 12, showing tubing, connectors and fittings.

As illustrated in FIGS. 3 and 10, the elongated tubes 130 and S tubes 144 situated in the upper side of panels A and B are connected to the 132 ones below them by means of six short tubes 140 which measure 25.4 mm (1 inch) diameter and 0.150 m (6 inches) long each. Said short tubes are orthogonally connected to the long ones acting as pillars to them securing an upright position and providing stiffness and strength to the whole framework 12, while maintaining standard spacing between upper and lower tubes.

As depicted in FIGS. 10-11, according to the embodiment of cart 10's structural design of the present invention, tubes 130 in the upper side of framework 12 and S-shaped tubes 144, were designed with the purpose of adding an extra height of 0.150 m (6 inches) to cart 10. This makes it higher relative to the ground level, so the handles 142 could be set at an average user's waist, and comfortable to reach in the operation of scooping and transporting snow. Said tubes also provide strength to framework 12.

Also, in the upper side of framework 12, handles 142 connected at the ends of the S tubes 144, add a linear distance of 0.150 m (6 inches) to the total length of framework 12 which comes up to 1.350 m (4½ feet) as shown in FIGS. 11-12. As illustrated in FIG. 12, handles 142 are separated 0.356 m (14 inches) one from the other.

FIG. 10, an exploded view of framework 12 of the present invention, illustrates the connections of all the tubes among each other by means of PVC connectors and fittings, all of 25.4 mm (1 inch) which are identified as follows:

Six (a) four way side outlets (Slip, all four ways)
Four (b) three way side outlets (Slip, all three ways)
Two (c) slip tees (fittings)
Two (d) 90 degrees elbows
Two (e) inner caps All the connectors nominal inner dimensions are 25.4 mm (1 inch) diameter, intended to be bonded to their respective tubes with Clear Primer and PVC cement, except for the SlipTees Fittings wherein the tubes can slip all the way through two adjoining outlets, as is the case of tubes 132 that slips through tee (c) between connectors (a) and elbows (d). The PVC Cement is a clear liquid specially designed to fuse PVC fittings and tubes together, strongly bonding them. The procedure is simple and known by most skilled in the art.

As shown in FIG. 10, the 90 degrees elbows (d) have the special role of giving strength and connecting the crossbar 138 to the elongated tubes 132. Said crossbar 138 is also the push piece of the driving member formed by framework 12 and plate 14, as depicted in FIG. 3

Also depicted in FIG. 10, are the Fittings (a), (b) and (c), which have a supporting role for the upper tubes 130, 132, and 144.

The Inner Caps Fittings (e) are used to close the ends of handles 142 to keep dirt or water out of said tubes 142.

All tubes of the present invention must be measured to the designed lengths from the center of their Connectors and/or Fittings, so it is important to consider an appropriate allowance in the overall length of the tubes before introducing them into the inner races of their respective Connectors and Fittings.

As depicted in FIG. 12, the addition of each individual elongated tube length measured from the center of their Connectors, help to calculate the total length of framework 12, as well as the total length of cart 10.

The four S shaped tubes 144, as depicted in FIGS. 3-10, have a linear size that has to be determined before being bent, which is done by an expert bender operating a bending machine or tool. Once connected to the straight elongated tubes next to them in the framework 12, the total length of framework 12 can be determined by adding the distance projected by the S shaped tubes over a straight horizontal plane, which is 0.300 m (1 foot) to the total length of framework 12, as indicated in FIG. 11 and in the top view of FIG. 12.

As illustrated in FIGS. 4-5-6, plate 14 is a rectangular piece made of aluminum which may be alloyed with magnesium and die-casted, which ensures proper rigidity, strength and corrosion resistance, needed for its supporting role to the lighter PVC material of framework 12 of the present invention. Said aluminum plate 14, in a weather of very low temperature, will gain strength. It can also be treated with an anodizing process, which provides increased corrosion protection and wear resistance. Said properties make cart 10 a convenient tool during harsh winters.

As depicted in FIG. 4, the referred aluminum plate's 14 dimensions are:

Average length—0.900 m (3 feet)
Average width—0.369 m (1 foot 2½ inches)
Thickness—6.35 mm (¼ inch)

Figure 15:
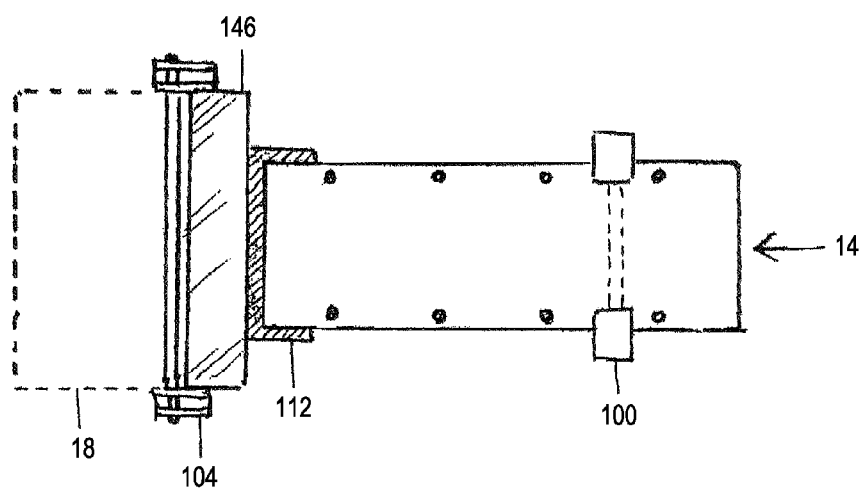
FIG. 15 Top plan view of invention's supporting plate 14, showing locations of boreholes.
Figure 16:
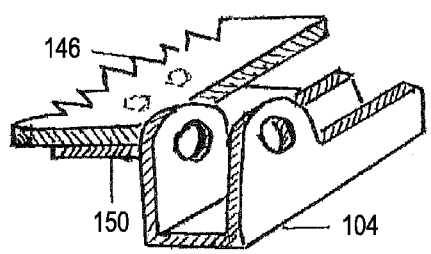
FIG. 16 Partial perspective view showing topside of a scoop-mounting bracket 104 adhered to broken away supporting plate 14.
Figure 17:
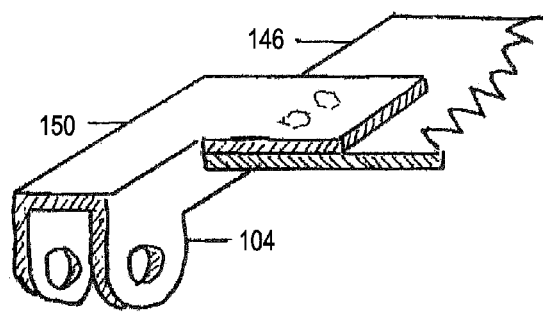
FIG. 17 Partial perspective view showing underside of a scoop 18's mounting bracket of FIG. 16.

Also as depicted in FIG. 4, said plate 14 is expanded widthwise at its forward end forming a rectangular portion 146, with two wings toward the sides and criss-crossing said plate 14 to form a T shape, with equal lengths of their wings. The referred expanded rectangular portion 146 has a length of 0.600 m (2 feet) which coincides with scoop 18's width, as depicted in FIG. 15. The width of rectangular portion 146 can be 152.4 mm (6 inches).

FIG. 5 illustrates said rectangular portion 146 at the forward end of plate 14, which is designed to provide a supporting base for the assembly of scoop 18 with brackets 104 on its right and left ends and scoop's axle 122 to be inserted in said brackets 104. Said brackets 104 are designed with a u-shape, and mounted by protruding them forwardly from the expanded plate 146.

There are die-casting industries that fabricates customized aluminum mounting brackets, with the same alloy used in the plate 14 of the present invention, that do not require assembling or welding pieces, a convenient characteristic as aluminum is stronger than parts made of welded steel. So that, the following brackets in the present invention embodiment are die casted:

U-shaped bracket 104, for scoop's axle 122
L-shaped bracket 100, for axle 26 of cart 10's wheels 16.
Angle bracket 112, for stop piece.
Mounting bracket 116, for springs 108.

FIG. 5 depicts two L-shaped mounting brackets 100 for cart's 10 large wheels 16. Said brackets 100 must be assembled with nuts and bolts on top of the small rectangular pieces sticking out from the sides of supporting plate 14. Said pieces measures can be: 50.8 mm by 50.8 mm (2 inches by two inches) The locations of said brackets 100 need to match exactly framework 12 middle length point, that way defining cart 10's fulcrums. Said middle point is shown in FIG. 12, dimensional relationship of present invention, and is situated at 0.675 m (2 feet 3 inches) between the upper and lower ends of framework 12.

Following the series of brackets details, based on cart 10's supporting plate 14, FIG. 5 depicts two U-shaped 90 degrees angle brackets 104 assembled at the ends of the extended portion plate 146 right and left ends for the tilting scoop 18. Said brackets 104 protruding forwardly therefrom, providing housing for hubs and bearings at the ends of axle 122 which is fixedly attached to the underside of scoop 18, providing support and facilitating tilting scoop 18 a free rotation.

The referred U-shaped brackets 104 of FIG. 5, are designed with two parallel 90 degrees legs which provides convenient spacing between them, and holes openings in their centers in order to house hubs and bearings for the scoop 18's axle 122, that way the double leg brackets 104 provides scoop 18 a double support when loaded.

The measures of brackets 104 can generally be of 76.2 mm (3 inches) long, 63.5 mm (2½ inches) height, and a separation between legs of 63.5 to 101.6 mm (3 to 4 inches). Said separation may vary depending on bearings sizes and availability offered by manufacturers.

As illustrated in FIGS. 16-17-18-19, the two U-shaped brackets 104 are formed with two parallel upright leg portions and a particular plane wing 150 designed at 90 degrees relative to said legs, and oriented toward the center line of cart 10. Both brackets have at least two boreholes in their plane wing 150 which are needed to attach said brackets 104 to the underside of extension plate 146, with nuts and bolts.

According to the design of the present invention the brackets 104 are die-cast custom made, with an aluminum-magnesium alloy. Given the particular design of brackets 104, there are a number of custom bracket manufacturers that can fabricate them attending to their needed requirements.

Figure 18:
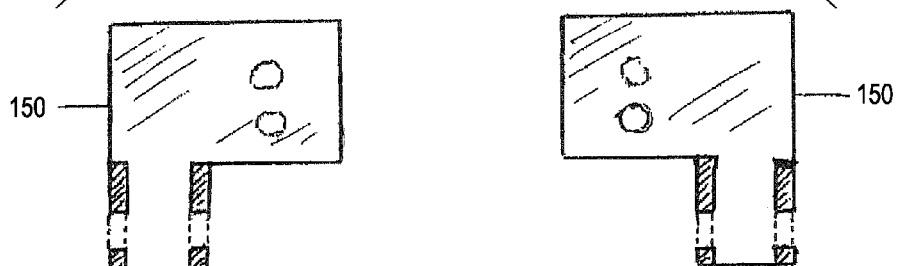
FIG. 18 Plane horizontal sectional views of scoop 18's mounting brackets 104.
Figure 19:
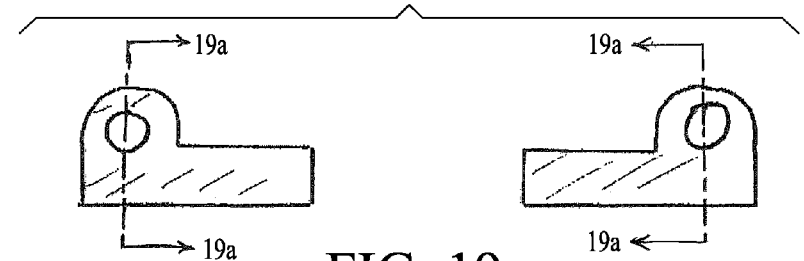
FIG. 19 Sectional view showing front of scoop 18's mounting brackets 104.
Figure 19A:
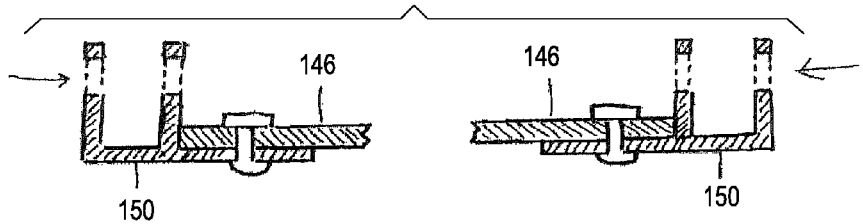
FIG. 19a discloses cross-sectional views of the mounting brackets 104 as disclosed within FIG. 19.

Sectional views of brackets 104 shown in FIGS. 18-19 illustrate both said brackets 104's horizontal sectional plane and front sectional view and how they are adhered to the outer ends of the extended plate 146 by means of at least two bolts and nuts on each bracket. Such procedure was chosen because said brackets can be conveniently and easily removed for the purposes of overhauling scoop 18, allowing for changes of parts like bearings, latch mechanism, springs, and repairing or cleaning.

Continuing with details of other brackets of the present invention, as depicted in FIG. 6, an angle bracket 114 is to be placed underneath plate 14, and has been expressly designed to be a supporting base for the assembly of two spring loaded swivel casters 106. Said supporting bracket 114 is made of aluminum which can be fastened with bolts and nuts or welded to the underside of plate 14.

FIG. 6, also illustrates bracket 116 adhered to plate 14 underside, and located right behind casters 106. Said bracket 116 holds springs 108 for scoop 18's tilting motions.

Figure 20:
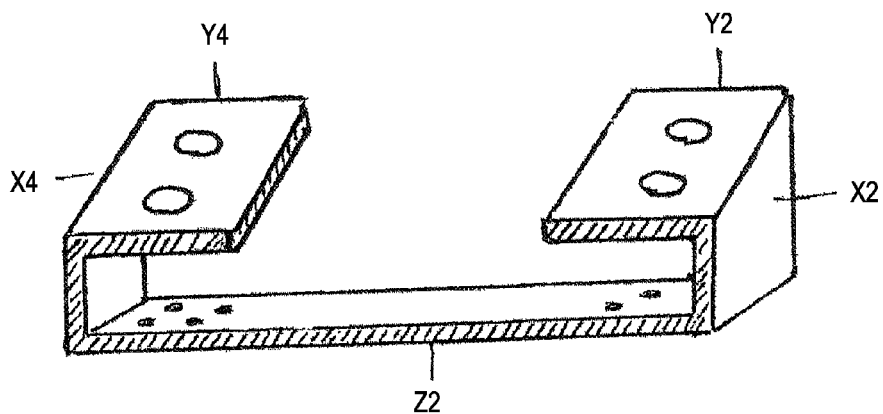
FIG. 20 Perspective view of the casters brackets 114 in upright position, showing its top slanted position y2-y4 and isosceles trapezoidal walls x2-x4.

A freehand drawing of FIG. 20, illustrates details of bracket 114 wherein its slanted shape can be noticed. The topside y2-y4 of said bracket 114 is particularly slanted and clearly not parallel to its bottom side z2 that is not slanted.

As shown in FIG. 20, it can clearly be noticed that geometrically said bracket 114 is formed by two orthogonal lateral walls standing parallel to each other in each opposite end of said supporting bracket 114. Said walls are shaped as isosceles trapezoids x2-x4 as they have two parallel lines and 90 degrees angles at their bases, which defines the slanted top side y2-y4 of bracket 114

Figure 21:
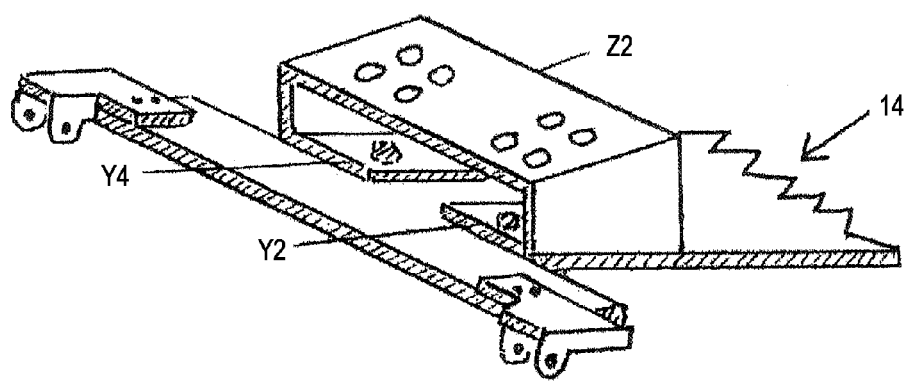
FIG. 21 Broken away perspective view of supporting plate 14 underside, with casters bracket 114 in inverted position, showing its non-slanted side z2.

FIG. 21 depict the first step of the assembly of bracket 114 wherein the slanted top side y2-y4 of said bracket 114 has been attached to the underside of plate 14 by means of at least two bolts and nuts in each side.

In FIGS. 21-22, it is important to note that the bottom side z2 of bracket 114, has been expressly designed as not slanted, to ensure that when cart 10 is on its normal inclined attack position, said bottom side of said supporting bracket 114 will remain parallel to the ground horizontal plane, which at the same time it will ensure a normal vertical position of casters 106 after they are assembled.

As depicted in FIGS. 21-22, the bottom side z2 of supporting bracket 114 must have boreholes in both of its ends. Said boreholes are designed to match the ones in the casters' 106 own mounting plates z4, like the one shown in FIG. 23A, so that said casters 106 can be adhered to bracket 114, by means of mechanic fasteners.

The number of holes to be bored in the bottom side z2 of supporting bracket 114, their diameters and fasteners sizes, will depend on the dimension of the holes of a caster's mounting brackets z4. These casters are to be chosen among different brand or styles choices offered by manufacturers, similar to the exemplary one depicted in FIG. 23 A.

FIG. 22 is a freehand partial perspective view of supporting bracket 114, with the slanted shape of its topside y2-y4 and boreholes for its attachment to plate 14. As shown, said topside divided into two separated legs can also be manufactured as one straight solid piece.

FIG. 22, also illustrates the assembly of casters 106 in its upright position, adhered to bracket 114 in the underside of plate 14. Said assembly of casters 106 is also shown in FIG. 6 in an inverted position, wherein springs 108' mounting bracket 116, also adhered to plate 14 underside, is located right behind said casters 106

In FIG. 22, it is also shown, that except for the length of supporting bracket 114, which can be 0.369 m (1 foot 2½ inches), other dimensions of said supporting bracket 114 like width and height need to be determined as they can vary, a fact that someone skilled in the art will readily understand. The referred dimensions will become available when casters 106 are selected depending on different styles of spring loaded/swivel casters in the market.

The overall height of the casters to be chosen, will define the height of supporting bracket 114, and although the width can be approximately 101.6 mm (4 inches), it will definitely be defined by the dimensions of the rectangular mounting plate z4 of the chosen casters 106, like the example one shown in FIG. 23A The casters 106, as an integral component of cart 10, must fulfill needed requirements that make them able to stand a harsh winter, run into curves, roll over unexpected, uneven sidewalks, be resistant to very low temperatures, so that cart 10 can be left outdoors for long periods of time.

Ideally said casters 106 could be of the following characteristics:

Made of metal like aluminum resistant to rust.

Have ball bearings in the swivel raceway.

Must be of the spring-loaded type for shock absorbing.

Have a yoke of 6.35 mm (¼ inch) thick, aluminum made.

Wheels diameters of 127.0 mm (5 inches).

Mounting plates of between 76.2 mm and 88.9 mm (3 to 3½ inches).

Overall height 153.9 mm (6 1/16 inches).

Special consideration must be given to the choosing of casters 106, which must be appropriately done, due to the fact that its total height added to the height of bracket 114 (to be determined) should be relative to wheels 16 radii, in order to secure that the 20 degree angle of inclination of cart 10 of the present invention will be maintained, with said wheels 16 and casters' 106 wheels coordinately and evenly touching ground, while cart 10 with its scoop 18 is in position to plow.

It is to be understood that the previously exemplified dimensions of casters 106 might vary, and so might the type and models of casters which must not be interpreted as a limitation to the embodiment of the present invention.

Figure 23B:
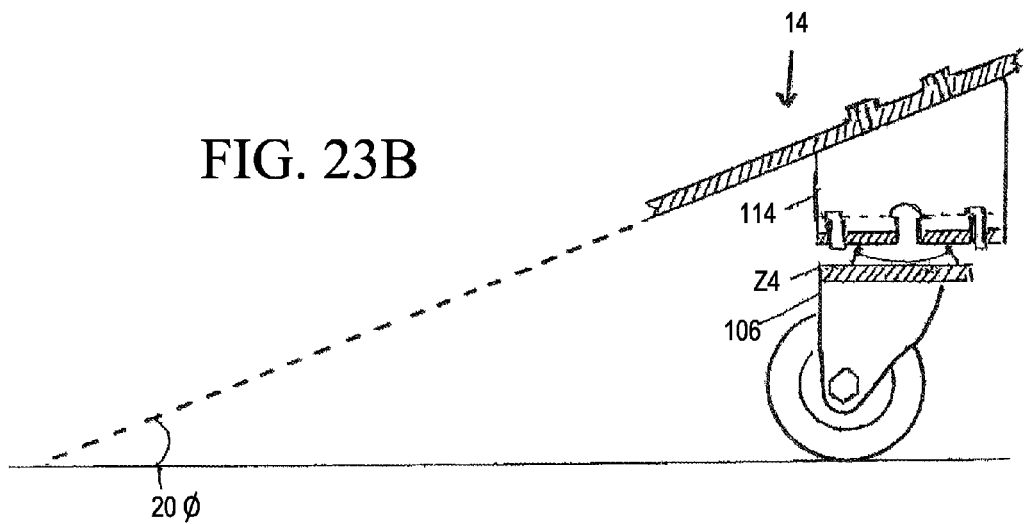
FIG. 23B Freehand side elevation view of a partial low end of the invention's supporting plate 14 in a 20 degree position showing the left hand side caster 106

FIG. 23B is a non-scaled, freehand partial drawing of a side elevation view illustrating the forward end of plate 14 in the lower portion of cart 10 with an inclination of 20 degrees relative to the ground level. Said drawing, is an enlargement of a caster depicted in FIG. 2, and demonstrates the assembly of the left side caster 106 after supporting bracket 114 has been attached to plate 14. The caster of the right side is assembled following the same steps as the one described for the left side.

Once the casters have been assembled, boreholes must be drilled in the underside of supporting bracket 114. Said holes must be of appropriate diameters since they need to be of the same sizes as the ones in the casters 106' own mounting plates z4 of FIG. 23A in order to match them. The same holds for the center hole, which needs to be of the same diameter as the stems of casters 106.

Figure 24:
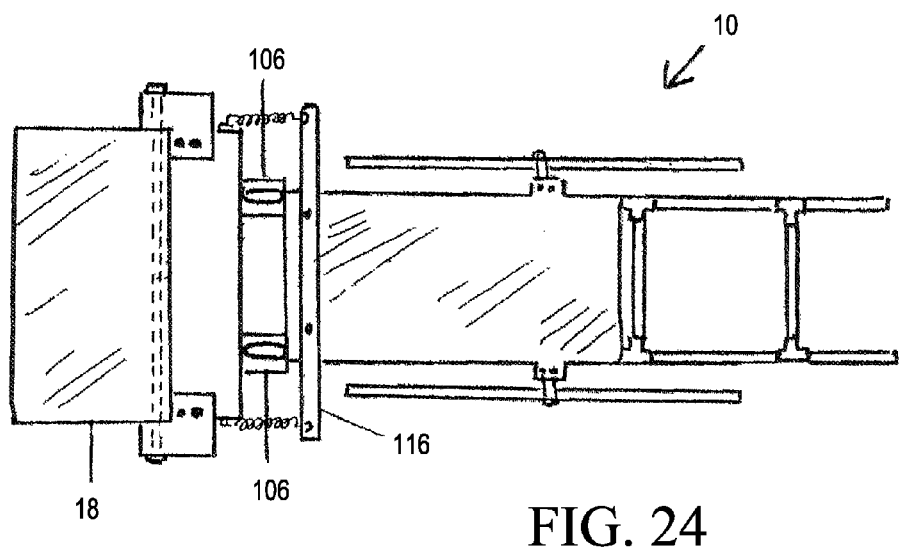
FIG. 24 Plan views with the invention's cart underside, showing casters 106 at rear of scoop, and bracket 116 for the scoop's springs.

As depicted in FIG. 24 of the present invention, a plan view of cart 10's underside, casters 106 are located in plate 14's underside and towards the rear of scoop 18. Said casters 106 are spaced apart at least 0.355 m (14 inches) a shorter dimension than the width of scoop 18's scooping edge that measures 0.610 (24 inches), which ensures that caster 106 will leave no tracks behind on the path of snow when cart 10 moves forward.

Another bracket based on supporting aluminum plate 14 depicted on FIG. 5, is the angle bracket 112 assembled over the top side of said plate 14, having been designed to act as a stop piece for driving member 12. Crossbar 138 being a push piece located in the lower end of framework 12, as shown in FIGS. 3-10.

Angle bracket 112 as stop piece consists of one straight solid bar made of the same aluminum magnesium alloy as plate 14. Said bracket 112 has two legs at 90 degrees angles in both of its ends and it is attached widthwise on top of plate 14.

The dimensions of bracket 112 can be as follows:
Thickness 6.35 mm (¼ inch)
Interior length 0.356 mm (1 foot 2 inches)
Exterior length 0.369 mm (1 foot 2½ inches)
Height 38.1 mm (1½ inches)
Right leg 101.6 mm (4 inches)
Left leg 101.6 mm (4 inches)

It is to be understood that the exemplified dimensions and appropriate selection of casters, like the ones previously described, are not to be interpreted as a limitation to the present invention's embodiment, and those skilled in the art may effect changes of said parts' dimensions without departing from the spirit and scope of the novel concept of the present invention.

Figure 25:
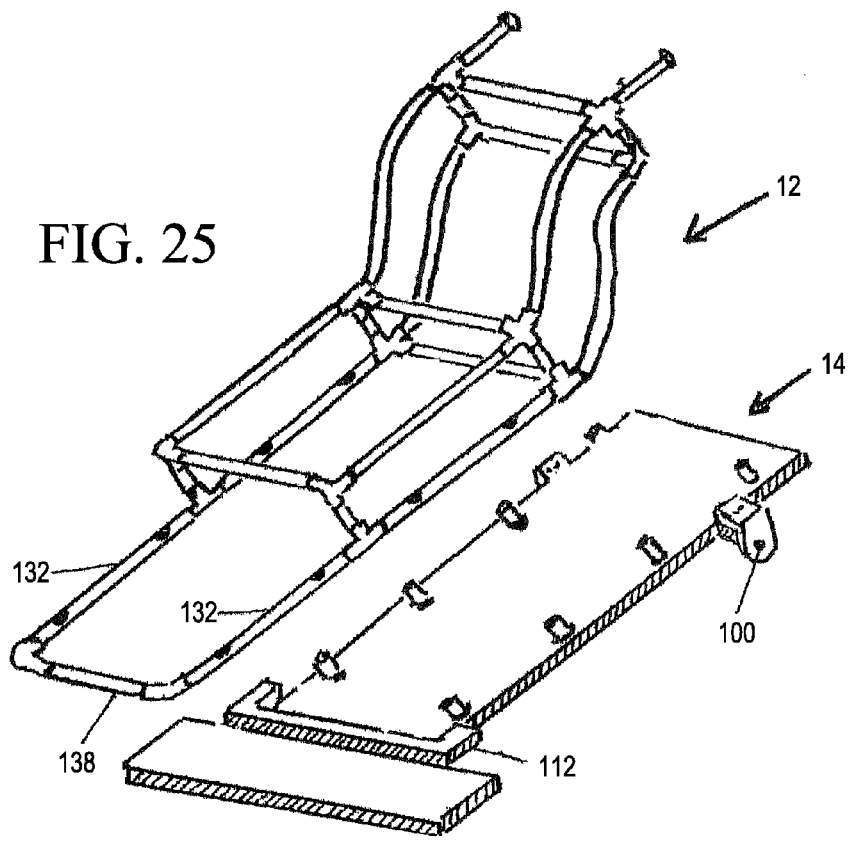
FIG. 25 Exploded view showing procedure to adhere framework 12 to supporting plate 14 of the present invention.

Having completed the previously identified mechanical descriptions of different brackets and subcomponents based on plate 14, and continuing with the present invention's construction details, FIG. 25 depicts the assembling of framework 12 on top of plate 14.

As illustrated in FIG. 25, the straight elongated tubes 132 at the bottom of framework 12 have a row of at least four boreholes at each side, right and left of framework 12. Likewise FIG. 25 shows the supporting plate 14 which also has the same number of boreholes on both the right and left sides. Said boreholes are intended to match the ones in said elongated tubes 132 of framework 12. As shown in FIG. 25 the boreholes can be spaced 0.203 mm (8 inches) apart, one from the other.

Finally, FIG. 25 illustrates framework 12 being presented on top of plate 14 toward a matching position so that the holes will coincide with the ones of plate 14. Then the two aforementioned components can be readily adhered which is done by means of special metallic fasteners.

Special consideration has been given to the fact of using the right kind of fasteners. There are a number of fasteners that can be used in plastics, but in the present invention it is advisable to consider the fact that it is not about attaching plastic against plastic, but plastic against a metallic plate. So, metallic rivets have been chosen to avoid damage to plastic tubes.

Bearing in mind the previous paragraph, in order to avoid damaging PVC tubes, it is necessary to choose: First, rivets that fit exactly in the boreholes; Second, rivets that are of the same diameter as the boreholes, since they are pre-drilled; and Third, the safest fastener to be used in the aluminum plate 14 is an aluminum rivet, nut flat head, as bolts are not recommended as they can damage the PVC.

Rivets made of the same material as plate 14, like aluminum alloyed with magnesium, are rust and corrosion free.

Figure 26:
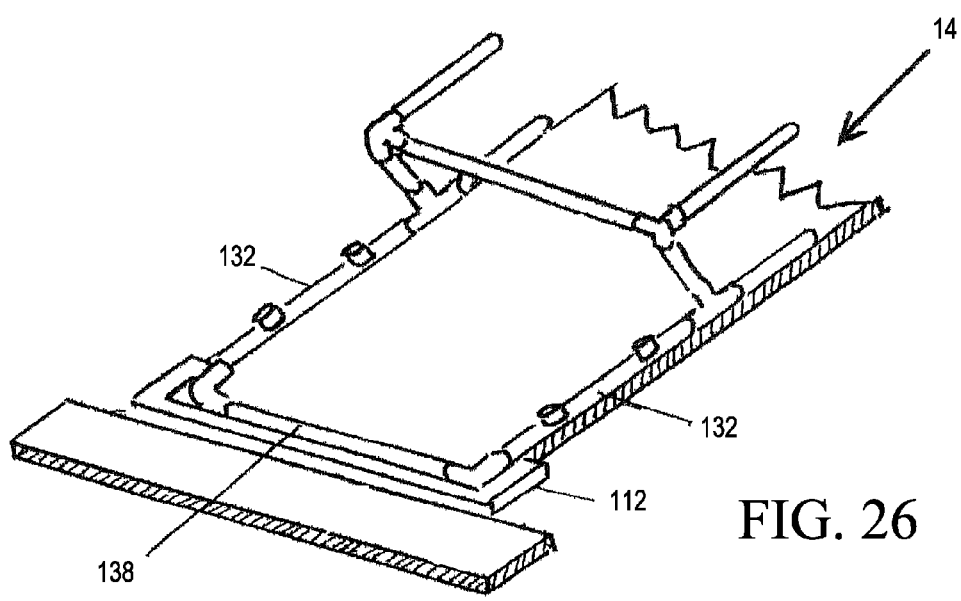
FIG. 26 Broken away perspective view of lower end of framework 12, after being adhered to plate 14.

FIGS. 26 and 3 illustrate plate 14 after having been adhered to framework 12, also showing the push piece 138 encircled by the angular bracket 112 acting as stop piece, with its two legs at 90 degrees.

Now, referring to the two large wheels 16 of cart 10 of the present invention, as identified in FIGS. 7-8, ideally they have the following characteristics:
Spokes and rim made of aluminum.
Outside diameter: 76.2 cm (30 inches)
Width: 53.97 mm (2⅛ inches)—Narrow
Type: Rubber, tubeless or semi-pneumatic.
Hub width: 114.3 mm (4¼ inches)
Hub bore: 19.05 mm (¾ inch)
Bore diameter: 19.05 mm (¾ inch)
Axle: steel—19.05 mm (¾ inch)
Bearings: sealed The wheels can be of the bicycle or garden type but preferably with sealed bearings, and fabricated with aluminum or aluminum alloy, because the aluminum bearing resists well rust and fatigue. The aluminum alloy performs best in snow conditions under high chance of rust. Sealed bearings 102 are preferred, compared to the unsealed ones whereas sealed bearing are fabricated by the wheels manufacturer so that they never need to be lubricated, which saves labor, not needing to disassemble surrounding components to perform maintenance. The hub can be of the free hub body type, which makes wheels very light weight and durable.

Also, the large diameter of both wheels 16 provides great leverage and support for taller lifting of the scoop 18, a necessary feature enabling the operator to comfortably plow different levels of snow which can be removed with minimum effort. As described in previous chapters, no effort at all is needed to discharge the snow load from the tilting scoop 18 as it will automatically fall off to the ground by the gravity force.

FIG. 6 depicts an axle 26 adhered to plate 14, said axle 26 position coincides with the framework 12 in the middle of its length and with the two U shaped brackets 100 that supports the wheels 16, as shown in FIGS. 7-8.

FIG. 6 also illustrates axle 26 after four pilot boreholes had been drilled on it. Said axle 26 then is tightly clamped with metallic fasteners run through said drilled holes. At least two metallic clamps should be used near each end of axle 26.

Axle 26 has to stick out from both sides of plate 14, approximately 10.2 cm (4 inches).

The dimensions of axle 26 are:
Diameter—19.05 mm (¾ inch)
Total length—59.88 cm (22 inches)

After the axle 26 has been attached to plate 14, as illustrated in FIG. 6, the axle 26's ends are fitted into the wheels mounting brackets 100 through its 19.05 mm (¾ inch) diameter bracket holes, being ready to proceed with the installation of wheels 16.

As depicted in FIGS. 6-7, the large wheels 16 are assembled in cart 10 by stuffing them into the protruding ends of the fixed axle 26 that penetrates into the wheels 16 hubs and bearings; said bearings enabling said wheels 16 to freely and smoothly spin.

After the wheels 16 are set in the fixed axle 26, the appropriate nuts that hold the wheels 16 in place are screwed in the outer side of said wheels. Finally, cotter pins are placed in the axle 26 ends, securing the wheels 16's assembly.

As depicted in FIGS. 2-11-13, it becomes apparent that the 20 degrees angle of attack of cart 10 with the scoop 18's scooping edge resting on a flat horizontal surface, is defined by the large wheels 16's radii of 38.1 cm (15 inches).

Said wheels 16's radii of 38.1 cm (15 inches), as embodied in the present invention, cannot be changed by wheels of different radii, as it would change the 20 degrees inclination of cart 10, set for the attack angle of scoop 18

The tall wheels 16 light construction, with the cart 10 set at 20 degrees of inclination, makes it easier for going through snow. Moreover, said wheels 16 are spaced 0.508 m (22 inches), a shorter dimension than scoop 18's scooping edge of 0.610 m (24 inches); that is 0.050 m (2 inches) shorter than scoop's width, which means cart 10's large wheels will leave no tracks behind when cart 10 moves forward.

Referring now to the scoop 18's details of construction, and installation on cart 10 of the present invention, the scoop

18 depicted in FIG. 9, is ergonomically configured as a rectangular container fabricated with PVC by injection molding. Although the scoop 18 could be fabricated from other light material, like aluminum, according to the present invention's embodiment, PVC has been selected as it is lighter than aluminum, and at the same time attuned to the PVC framework 12 and with the same favorable characteristics.

The scoop 18, situated in the most forward extent of cart 10, is fabricated with four sides consisting of two opposing sidewalls, one rear wall and a bottom side. Said rectangular scoop 18 is open in its front edge, which is designed for plowing and scooping snow. Said scoop 18 side walls stands orthogonally and parallel to each other, and said side walls ergonomically designed with an S shape with their lower contours ending in the corners of the scoop's plowing edge. Said S contour helps facilitate the plowing action of scoop 18 by reducing resistance of the accumulated snow when pushing cart 10 forward.

The scoop's width has been particularly designed to embark considerable amounts of snow with fewer passes wherein snow can be removed in a short amount of time.

The bottom of scoop 18 depicted in FIG. 9 has an underside metallic reinforcement, which can be made of an aluminum sheet bonded to the substrate of the PVC underside of scoop 18 through an annealing procedure, or as an alternative through a conventional procedure of attaching a metallic sheet using mechanical fasteners, ideally rivets, nut flat head, in order to avoid damaging the PVC in the bottom of scoop 18.

The scoop 18's underside metallic reinforcement should be of the same dimensions of the scoop's bottom, covering all its rectangular area. The aluminum reinforcement could encircle the scoop's scooping edge to provide protection to its PVC material against wear and tear. As an alternative, a squeegee can be attached to the scoop's edge, or still another device like a snap on wear strip that can be attached to the edge without tools.

Figure 28:
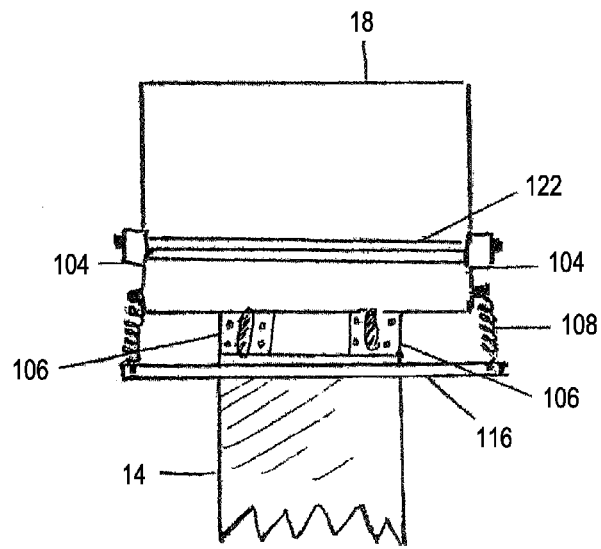
FIG. 28 Broken away plan view of cart 10's partial lower end underside, showing assembly of springs for scoop's tilting motion.
Figure 31:
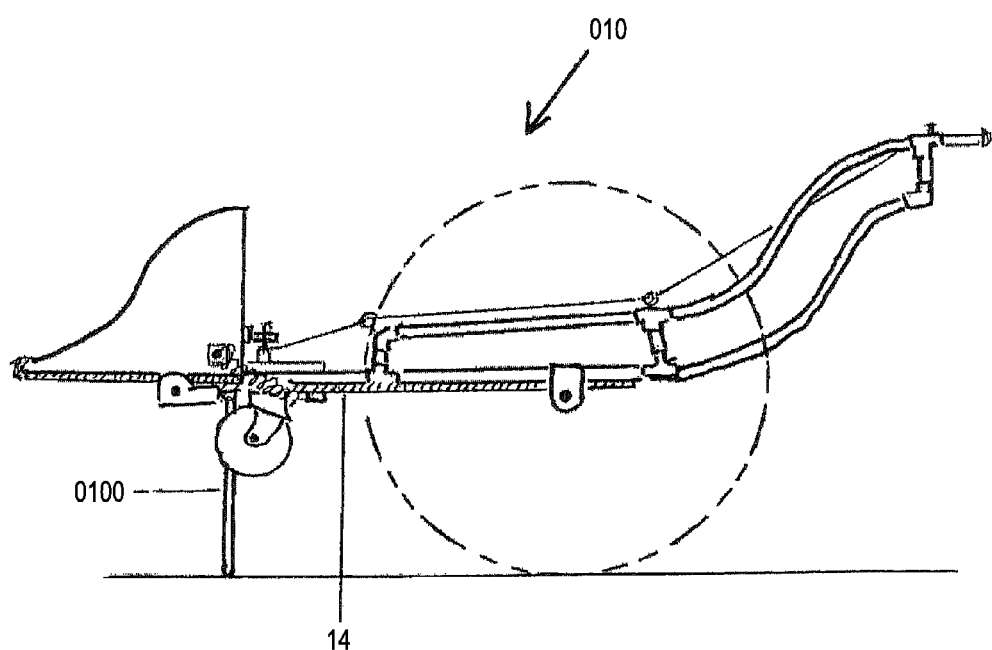
FIG. 31 Side elevation view of cart 010 showing collapsible post 0100 underneath plate 146 with said post in a vertical position to keep scoop 18 standing parallel to ground level.

As illustrated in FIG. 27, the present invention of a snow plow/scoop cart 10 brings along a scoop 18 with a mechanical assembly, distinct from prior arts wherein the flipping motion is an innovation based on the following subcomponents acting cooperatively and related to each other:

a) An axle 122 fixedly attached to the underside of scoop 18, shown in FIG. 9.
b) Two double legged U-shaped brackets 104, mounted on the forward end of plate 14 attached to its extended portion 146 as shown in FIGS. 3-5.
c) A latching device consisting of a pin 124 protruding from rectangular bracket 152 in the rear wall of scoop 18.
d) A latching assembly 118 for the release mechanism closely adjacent to scoop 18's rear wall.
e) A lever 148 mounted in the crossbar 134 of FIG. 2 devised to actuate the release mechanism 154, by means of a flexible cable 126 connected to said lever 148 and to the latch release handle 128.
f) A hub and ball bearing in both ends of axle 122.
g) A set of two metallic springs 108, as shown in FIG. 28, provided for the return motion of scoop 18 back to its starting upright position.

The coordinated work of said subcomponents is instrumental to achieve the innovation embodied in the present invention with regard to definitely putting an end to users' exertions in the discharging of snow operation. Said innovation replaces the conventional system in scoops of prior arts, wherein arm strength and body weight were needed from users to discharge the snow loads from scoops. Then, said situation has been solved in the present invention by a self-dumping mechanical system, which can be operated by bringing the scoop 18 to an appropriate height without body bending, so the snow can be discharged by said mechanical system by tilting down said scoop 18 on its ball bearings and expelling the load by the force of gravity.

The dimensions of scoop 18 can be as follows:
Walls thickness 6.35 mm (¼ inch)
Length 457.2 mm (18 inches)
Width 0.610 m (2 feet)
Overall height 0.300 mm (1 foot)
Axle diameter 15.88 mm (⅝ inch)
Axle length (app) 0.839 m (2 feet 9 inches)

The top edges of the scoop 18's sidewalls are to be bent out and around to provide said sidewalls strength and rigidity.

As depicted in FIG. 27 there is a pin 124 sticking out from the middle of the scoop's rear wall. Said pin 124 made of metal, has a mounting support bracket 152, also made of metal adhered thereon. Said pin 124 has been designed to hold the latch hook 120 coordinately working with said latching device.

Also, illustrated in FIG. 9, there is an axle 122 fixedly attached to the metallic reinforcement 102 in the underside of scoop 18 by means of clamps. Said axle 122 is situated at a distance of one third of the scoop 18's length of 457.2 mm (18 inches), measuring 154.4 mm (6 inches) from the rear wall edge of scoop 18. The remaining ⅔ (two thirds) of the scoop's length measures 304.8 mm (1 foot).

The referred axle 122 fixedly attached to the underside of scoop 18, is thereby fitted into its mounting brackets 104 as depicted in FIG. 27 defining the scoop's 18 fulcrum, wherein the scoop 18 moves freely in a seesaw motion.

Now, the position of said axle 122 at one third of scoop 18's length, according to the working embodiment of the present invention, creates a special mechanical outbalance for the scoop 18. Said position of axle 122 that divides the total length of scoop 18 into two unequal arms, makes the longest arm of said length outweigh the shorter one, causing the scoop 18 (fixedly attached to its axle) to tilt down on its longer arm, with or without a load, due to the changes of gravity and mass as it travels its tilting path.

Prior to installing the scoop 18 on its supporting bracket 104, hubs and ball bearings are to be fitted in the space between the legs of supporting brackets 104

Once the hubs and bearings have been secured in their places between the legs of brackets 104, the scoop 18 can be assembled by running its fixedly attached axle 122 end across the first hole of the left bracket 104 into the hub. The same procedure is followed in the right side bracket of scoop 18. Immediately afterward the scoop 18 will rotate freely in its tilting motion.

A further object of the present invention is to provide an improved mechanism for tilting scoops in large wheeled snow removal apparatuses, consisting of an assembly with a latch device that automatically manages the self-dumping motions of a tilting scoop.

The latch mechanism depicted in FIG. 27, permits a one hand operation, having a latched and unlatched position. Said latch 118 assembly located relative to scoop 18 is attached to a metallic base 110. Said latch 118 holds the scoop 18 on its rest position by means of a spring loaded biasing assembly 156 so that scoop 18 stays on its latched position.

FIG. 27 illustrates the latching system of the scoop 18, which generally consists of a latching pin 124 protruding orthogonally from said scoop 18's mid rear wall, said pin 124 having a metallic mounting plate 152.

Adjacent to the rear wall of scoop 18, a latching mechanism is provided with a latch pin 154 and a latch 118's release handle 128. As shown in FIG. 27 the latch 118's handle 128 having a hook 120, is pivotally supported about a latch mounting pin 154 and a return spring mounted on said pin 154 as a biasing device built inboard bracket 156 that houses the hook 120 and handle 128. Furthermore, as depicted in FIG. 27 there is a rectangular piece made of aluminum designed to provide a mounting base 110 for the assembly of the scoop 18's latching device. Said base 110 is adhered on top of plate 14 by means of metallic bolts and nuts.

The mounting base 110 located behind the scoop 18's rear wall, have flanges on its right and left sides with two boreholes in each flange to adhere said base 110 to plate 14. The dimensions of said mounting base 110 can be:

Length 203.2 mm (8 inches)
Width 203.2 mm (8 inches)
Flange 1 50.8 mm (2 inches)
Flange 2 50.8 mm (2 inches)

FIG. 27 illustrates latch 118, which can move from its latched to unlatch positions by manually pulling cable 126 from lever 148 depicted in FIG. 2. Said cable 126 is connected to the handle 128 of latch 118 close to the rear of scoop 18, and to the lever 148 mounted in crossbar 134 of FIGS. 3 and 14 on the upper end of framework 12 of the present invention. When said cable 126 is pulled by an operator, the latch in latched position is unlatched causing the scoop 18 to tilt down discharging its load, as detailed in FIG. 14.

So far, as detailed in FIG. 14, the most significant operation of the tilting scoop 18 of the present invention, has been described by evidencing the fact of its load self-dumping capability, based on a latching mechanism. Now, the next important object of the present invention is the capability provided by a mechanical device that enables the scoop 18 to automatically return by itself to its starting position, after having discharged its load of snow, without any physical effort or exertions from the user of cart 10. Said mechanism consists of a couple of springs 108, situated on scoop 18's side walls, exterior surface, as depicted in FIGS. 28-29.

Due to springs 108' own force and its own stored energy to recover its natural length, once the scoop 18 stops discharging the load of snow, lightening its mass weight, the springs 108 pull back said scoop 18 making it rotate back in its opposite direction toward its original starting position. At that point, when the scoop 18 sits on its bedding place, the user lets go of cable 126 by releasing lever 148 so that the latch returns from the unlatched position back to its latched position; that is the one needed to immobilize the scoop 18 for plowing operations.

In accordance with the working embodiment of the present invention, the springs 108 are of the "extension type", which although it may be easy to assemble, emphasis must be put on its design, which will become apparent to those skilled on the art wherein all necessary technical data about said extension springs and application should be considered, like for example: balanced number of coils to be used to avoid stress and fatigue of the springs 108, also type of hooks and connections that ensures a safe tilting work of scoop 18. Different end configuration and hooks may be used to secure springs 108 to the pulling source, which is scoop 18.

Some of the design characteristics that may be considered for springs 108 are:

Extension elastic ranges, resistant structure and fatigue strength.
Space needed to install the springs, end to end.
Distance of travel required.
Inside length of hooks.
Overall length of springs.
Spring force needed.
How many pounds per inch (Lbs/in) in the extension of travel needed to determine the point of stop of scoop 18. (According to the Law of Elasticity, the extensions of springs are to be in direct proportion with the load applied to it).
Type of metal in the springs.

The cold, wet environment where cart 10 of the present invention is going to be used, in the removal of snow, requires materials like stainless steel for springs 108, wherein plating of zinc offers corrosion resistance.

As shown in FIGS. 24, 28 and 29 a metallic bracket 116, adhered to the underside of plate 14, extended widthwise, sticks out from plate 14 edges, providing holes on its ends for the springs 108' hooks to go into.

Also shown in FIGS. 27-28 is the free end of a spring 108 situated in the right side of scoop 18, by means of a metallic shoulder bolt protruding from said sidewall. Driving said metallic fastener into the PVC wall of scoop 18 requires special care, in which case it is necessary to place a metallic reinforcement plate thereto, adhered to said scoop 18's wall.

When a heavy load strongly pulls down the scoop 18, at the end of its tilting travel, its motion must be stopped at a certain angle to avoid a jerking that could damage the axle 122 and bearings of scoop 18. Said angle relies on the travel extension of springs 108, which must be previously subjected to a calculation by someone skilled in the art, before being assembled. The calculated extension of travel of the springs 108 will define the point at which scoop 18 can be safely stopped, which ideally could be an angle of 10 degrees relative to a vertical axis as shown in FIG. 30.

According to the embodiment of the present invention, the springs 108 are the ones commonly seen on different applications, however there is a type of extension (or tension) spring known as "drawbar" that could be chosen by virtue of a compression spring that carries inside of it, which adds a convenient advantage as it has a solid stop and is used wherein a potential overload may arise. Drawbar extension springs use special hooks, and if it would break due to an unexpected overload of snow, it still will continue to carry a load.

Although the preferred embodiment of the present invention, as first option, refers to the use of regular or drawbar type of metallic springs, mainly due to their resistance to corrosion in a wet environment, as an alternative, elastomeric springs could be used in place of metallic springs. Again, those skilled in the art would be able to determine whether it is appropriate to use it in the present invention, which would have to be done by calculations based on technical data like tensile stress related to the load, its length, thickness etc., by means of spring rate formulas.

It is to be understood that changes of sizes in different subcomponents of the scoop 18's tilting system like axle length, spaces between brackets legs, hubs and bearings, and scoop's springs may be effected by someone skill in the art, without departing from the spirit and scope of the present invention.

Lastly, cart 10 of FIG. 1, can be used as a garden cart, an additional bonus as specified in the second paragraph of the present invention's Background and Summary. It can be readily noted by someone skilled in the art, that structurally cart 10's embodiment provides the capability that allows it to be used for purposes other than snow removal, which will be readily perceived by cart 10's users.

As illustrated in FIG. 01, a side elevation view, after considering cart 10 a dual purpose utility apparatus, when it takes the role of garden cart 010. As a garden cart 010 of FIG. 01, it can be loaded with light items for example plants, cut pieces of light branches, bags of lawn clippings, bags of fertilizers, mulch, and others as long as it does not surpass a normal weight of a full scoop of snow of about 11.3 Kg (50 Lbs.). It should be noted that said cart now 010, has a limitation that makes it advisable not to use it for picking up or transporting heavy items.

One advantage of cart 010 as a garden cart, is that its lower portion can be easily tipped with the scoop 18 immobilized by its latch on its locked position, in order to load or discharge garden items. Also, in the standing upright position of FIG. 01, post 0100 enables cart 010 to remain outdoors with plants or flowers, as a seasonal garden ornament.

As depicted in FIG. 01, a collapsible piece, post 0100 made of an aluminum tube, can be adhered to the lower portion of cart 010's underside, to keep it in a standing upright position parallel to the ground level. Said collapsible post 0100 can be configured as only one bent tube with a rectangular shape, with its two ends pivoted in two L shaped brackets 0102 assembled in plate 146's underside. The dimensions of the post 0100 can be 25.4 mm (1 inch) diameter, and 38.1 cm (15 inches) of length each leg or about cart 010's wheels radii.

FIG. 02 depicts the locations of post 0100's brackets 0102 assembled in plate 146's underside right behind scoop 18's brackets 104 also adhered to plate 146.

FIG. 03 demonstrates that post piece 0100 has only two positions and can only be moved first from its standing position of FIG. 02, and after turning 90 degrees upward, toward its second position resting over plate 146's underside, where it is retained by two clutches 0104, ensuring that movements of cart 010 are not interfered by said post 0100.

Ultimately, it is to be understood, that the embodiment of the present invention is an apparatus capable of performing the dual functions of snow removal and garden cart. As such, those skilled in the art will appreciate that some modifications, like variation of sizes or styles of subcomponents, for carrying out the purpose of the present invention, may be effected in such a way that replacement of equivalent parts, do not depart from the spirit and scope of the present invention.

What is claimed is:

1. A snow plow/scoop cart, comprising:
    a support plate;
    a handled framework, for control by an operator, fixedly secured to said support plate;
    a pair of first wheels rotatably secured to opposite sides of said support plate for enabling said snow plow/scoop cart to be moved along a surface;
    a scoop pivotally attached to a forward end portion of said support plate around a horizontally oriented axis so as to be pivotally movable between a first scoop position, at which a load is scooped, and a second discharge position, at which the load is discharged;
    a latch/lock mechanism, comprising a latch pin fixedly mounted upon said scoop and a latch hook pivotally mounted upon said support plate, releasably connecting said scoop to said support plate so as to permit said scoop to effectively be latched/locked at said first scoop position when said latch hook of said latch/lock mechanism is engaged with said latch pin of said latch/lock mechanism, and to permit said scoop to effectively be unlatched/unlocked and to automatically move from said first scoop position to said second discharge position as a result of said latch hook of said latch/lock mechanism being disengaged from said latch pin of said latch/lock mechanism; and
    an operator-control mechanism operatively connected to said latch hook of said latch/lock mechanism so as to permit the operator to control said latch hook of said latch/lock mechanism and thereby selectively position said scoop at said first scoop position and said second discharge position.

2. The snow plow/scoop cart as set forth in claim 1, further comprising:
    a pair of second wheels rotatably secured to opposite sides of said support plate, and at forward end portions of said support plate, for cooperating with said pair of first wheels for enabling said snow plow/scoop cart to be moved along the surface.

3. The snow plow/scoop cart as set forth in claim 2, wherein:
    said pair of second wheels comprise caster wheels which are pivotal around vertical axes so as to permit said snow plow/scoop cart to be directionally controlled along the surface.

4. The snow plow/scoop cart as set forth in claim 1, further comprising:
    at least one spring mechanism interconnecting said scoop to said support plate for automatically returning said scoop to said first scoop position, so as to again be disposed in said latched/locked position by said latch/lock mechanism, after the load has been discharged from said scoop.

5. The snow plow/scoop cart as set forth in claim 4, wherein:
    said at least one spring mechanism comprises two laterally spaced spring mechanisms having first end portions fixedly connected to opposite sides of said support plate and second end portions fixedly connected to opposite sides of said scoop.

6. The snow plow/scoop cart as set forth in claim 1, wherein:
    said handled framework is fabricated from PVC tubing.

7. The snow plow/scoop cart as set forth in claim 1, wherein:
    said operator-control mechanism comprises a control cable having a first end portion fixedly connected to said latch hook of said latch/lock mechanism, and a second portion fixedly connected to an operator-controlled lever mechanism.

8. The snow plow/scoop cart as set forth in claim 1, wherein:
    said horizontally oriented axis around which said scoop is pivotally attached to said support plate is located substantially closer to a rear portion of said scoop than a forward portion of said scoop such that when the load is disposed within said scoop, and said latch pin of said scoop is unlatched from said latch hook of said support plate, said scoop will automatically pivot downwardly, under the force of gravity, thereby discharging the load.

9. The snow plow/scoop cart as set forth in claim 1, wherein:
    said scoop is fabricated from PVC.

10. The snow plow/scoop cart as set forth in claim 1, wherein:
    said support plate is fabricated from metal.

11. The snow plow/scoop cart as set forth in claim 10, wherein:
    said metal is aluminum.

12. The snow plow/scoop cart as set forth in claim 1, further comprising:
    a post pivotally attached at one end portion thereof to an undersurface portion of said support plate between a first extended position at which said post extends substantially perpendicular to said support plate such that a second end portion of said post engages the surface upon which said snow plow/scoop cart is disposed so as to support said support plate and said scoop at an elevated position above the surface upon which said snow plow/scoop art is disposed, and a second collapsed position at which said post is disposed substantially parallel to said undersurface portion of said support plate.

* * * * *